US012348455B2

(12) United States Patent
Yu et al.

(10) Patent No.: US 12,348,455 B2
(45) Date of Patent: *Jul. 1, 2025

(54) MULTI-CHANNEL HYBRID TRANSMISSION METHOD AND APPARATUS IN WIRELESS LOCAL AREA NETWORK

(71) Applicant: HUAWEI TECHNOLOGIES CO., LTD., Guangdong (CN)

(72) Inventors: Jian Yu, Shenzhen (CN); Ming Gan, Shenzhen (CN); Yunbo Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/658,112

(22) Filed: May 8, 2024

(65) Prior Publication Data

US 2024/0364477 A1    Oct. 31, 2024

Related U.S. Application Data

(63) Continuation of application No. 17/550,690, filed on Dec. 14, 2021, now Pat. No. 12,003,457, which is a
(Continued)

(30) Foreign Application Priority Data

Dec. 29, 2017    (CN) .......................... 201711487258.9

(51) Int. Cl.
*H04L 5/00*    (2006.01)
*H04L 25/02*   (2006.01)
(Continued)

(52) U.S. Cl.
CPC .......... *H04L 5/0053* (2013.01); *H04L 5/0048* (2013.01); *H04L 25/0204* (2013.01);
(Continued)

(58) Field of Classification Search
None
See application file for complete search history.

(56) References Cited

U.S. PATENT DOCUMENTS 9,363,048 B2    6/2016    Hart
9,686,757 B1    6/2017    Lee et al.
(Continued)

FOREIGN PATENT DOCUMENTS

CN    101248622 A    8/2008
CN    102572936 A    7/2012
(Continued)

OTHER PUBLICATIONS

IEEE P802.11ax /D2.0, "Part 11: Wireless LAN Medium Access Control (MAC) and Physical Layer (PHY) Specifications; Amendment 6: Enhancements for High Efficiency WLAN," Oct. 2017, 596 pages.
(Continued)

*Primary Examiner* — Diane L Lo
(74) *Attorney, Agent, or Firm* — Fish & Richardson P.C.

(57) ABSTRACT

This application relates to the field of wireless communication, and in particular, to a multi-channel hybrid transmission technology. In an embodiment, a data transmission method comprises: generating, by a first wireless communications device, a physical protocol data unit (PPDU), wherein the PPDU comprises a legacy short training field (L-STF), a legacy long training field (L-LTF), a legacy signal field (L-SIG), and two signature symbols after the L-SIG in a time-domain, and wherein the two signature symbols are identical and are modulated based on binary phase shift keying (BPSK), the two signature symbols identify a wireless communications standard the PPDU
(Continued)

complies with; and transmitting, by the first wireless communications device, the PPDU to a second wireless communications device.

18 Claims, 20 Drawing Sheets

Related U.S. Application Data continuation of application No. 16/912,258, filed on Jun. 25, 2020, now Pat. No. 11,218,351, which is a continuation of application No. PCT/CN2018/123356, filed on Dec. 25, 2018.

(51) Int. Cl.
*H04L 27/20* (2006.01)
*H04L 27/26* (2006.01)

(52) U.S. Cl.
CPC ...... *H04L 27/2053* (2013.01); *H04L 27/2603* (2021.01); *H04L 27/2605* (2013.01); *H04L 27/26132* (2021.01); *H04L 27/26136* (2021.01)

(56) References Cited

U.S. PATENT DOCUMENTS

| | | | |
|---|---|---|---|
| 12,003,457 B2* | 6/2024 | Yu | H04L 5/00 |
| 2014/0307612 A1 | 10/2014 | Vermani et al. | |
| 2015/0139206 A1 | 5/2015 | Azizi et al. | |
| 2015/0146653 A1 | 5/2015 | Zhang et al. | |
| 2016/0219522 A1 | 7/2016 | Asterjadhi et al. | |
| 2016/0366644 A1 | 12/2016 | Ghosh et al. | |
| 2016/0373955 A1 | 12/2016 | Gidvani et al. | |
| 2017/0055284 A1 | 2/2017 | Min et al. | |
| 2017/0118764 A1 | 4/2017 | Sutskover et al. | |
| 2017/0367095 A1 | 12/2017 | Chen et al. | |
| 2018/0091256 A1 | 3/2018 | Sutskover | |
| 2018/0110065 A1 | 4/2018 | Lin et al. | |
| 2018/0124778 A1 | 5/2018 | Verma et al. | |
| 2018/0205441 A1 | 7/2018 | Asterjadhi et al. | |
| 2018/0310342 A1 | 10/2018 | Patil et al. | |
| 2019/0041509 A1 | 2/2019 | Jiang et al. | |
| 2020/0162302 A1 | 5/2020 | Sahin et al. | |

FOREIGN PATENT DOCUMENTS

| | | | |
|---|---|---|---|
| CN | 103428810 | A | 12/2013 |
| CN | 105517157 | A | 4/2016 |
| CN | 106160965 | A | 11/2016 |
| CN | 106487490 | A | 3/2017 |
| CN | 106937382 | A | 7/2017 |
| CN | 107087304 | A | 8/2017 |
| CN | 107409396 | A | 11/2017 |
| EP | 2945455 | B1 | 5/2019 |
| WO | 2014123349 | A1 | 8/2014 |

OTHER PUBLICATIONS

IEEE P802.11ba/D0.01, "Part 11: Wireless LAN Medium Access Control (MAC) and Physical Layer (PHY) Specifications; Amendment 9: Wake-Up Radio Operation", Nov. 2017, 28 pages.
Office Action issued in Chinese Application No. 201711487258.9 on Mar. 8, 2021, 25 pages (with English translation).
Office Action issued in Chinese Application No. 201711487258.9 on Oct. 20, 2021, 9 pages.
PCT International Search Report and Written Opinion issued in International Application No. PCT/CN2018/123356 on Apr. 1, 2019, 15 pages (with English translation).

* cited by examiner

MULTI-CHANNEL HYBRID TRANSMISSION METHOD AND APPARATUS IN WIRELESS LOCAL AREA NETWORK

CROSS-REFERENCE TO RELATED APPLICATIONS

This application is a continuation of U.S. patent application Ser. No. 17/550,690, filed on Dec. 14, 2021, which is a continuation of U.S. patent application Ser. No. 16/912,258, filed on Jun. 25, 2020, now U.S. Pat. No. 11,218,351, which is a continuation of International Application No. PCT/CN2018/123356, filed on Dec. 25, 2018. The International Application claims priority to Chinese Patent Application No. 201711487258.9, filed on Dec. 29, 2017. All of the afore-mentioned patent applications are hereby incorporated by reference in their entireties.

TECHNICAL FIELD

This application relates to the field of wireless communications, and in particular, to a multi-channel hybrid transmission method and apparatus in a wireless communications system.

BACKGROUND

As a wireless local access network (WLAN for short) communication standard evolves and develops from 802.11a to 802.11g, 802.11n, 802.11ac, 802.11ax, and the like, a transmission bandwidth and a number of space-time streams that are permitted in the standard gradually change. A transmission bandwidth supported by the standard 802.11a or 802.11g is 20 MHz, a transmission bandwidth supported by the standard 802.11n is 20 MHz or 40 MHz, and a transmission bandwidth supported by current 802.11ax is 20 MHz, 40 MHz, 80 MHz, or 160 MHz. In a WLAN system, a higher bandwidth is used to obtain a higher transmission rate.

Channels in the WLAN standard are generally classified into a primary channel and a secondary channel. When an access point (AP for short) or a station (STA for short) accesses a channel, the primary channel is first monitored. When the primary channel is idle, whether the secondary channel is idle is further monitored. When it is learned through monitoring that the primary channel is occupied, even if the secondary channel is idle, data cannot be transmitted on the idle secondary channel. Therefore, channel utilization is relatively low. For example, a channel bandwidth is 160 MHz, and includes a primary channel and a plurality of secondary channels. When a station that complies with a standard protocol such as 802.11a, 802.11g, or 802.11n performs data transmission on the primary channel or some channels including the primary channel, another station or an access point learns through monitoring that the primary channel is busy. Even if the secondary channel is idle, the data transmission cannot be performed on the secondary channel.

Therefore, in a WLAN system, especially when channels include a primary channel and one or more secondary channels, that is, when there are a plurality of channels, it is important to improve channel utilization and transmission efficiency. In a currently proposed multi-channel hybrid transmission technology, a type of station may occupy a primary channel and one or more secondary channels for data transmission, and another type of station may occupy another one or more secondary channels for data transmission at the same time. This improves channel utilization, but flexibility is insufficient.

SUMMARY

To resolve the foregoing problem, this application provides a data transmission method and apparatus, applied to a wireless communications system.

According to a first aspect, an embodiment of this application provides a data transmission method of an access point side. The method includes: An access point AP sends first control information for one or more first stations STAs on at least a primary channel, where the first control information includes a first indication, used to indicate one or more sub-channels. The access point AP sends a first data packet for the one or more first STAs on a first part channel of a total channel, where the first data packet includes second control information on the one or more sub-channels indicated by the first indication. Simultaneously, the AP sends a second data packet for one or more second stations on a second part channel of the total channel. The first control information and/or the second control information include/includes resource scheduling information for the one or more first STAs, and a capability set of the first STAs is different from that of the second STAs. According to the solution provided in this embodiment of this application, the AP and the STAs may support more flexible multi-channel hybrid transmission, and complexity of reading the resource scheduling information by the first STAs is reduced.

In a possible design, the first STAs may comply with a first standard, the second STAs may comply with a second standard, and the first standard may be backward compatible with the second standard.

In a possible design, the first control information may include the resource scheduling information for the one or more first STAs, and the second control information may also include the resource scheduling information for the one or more first STAs. Therefore, robustness of the system is improved.

In a possible design, the first control information does not include the resource scheduling information for the one or more first STAs, and the second control information includes the resource scheduling information for the one or more first STAs, so that overheads of the first control information may be reduced.

In a possible design, the first control information may include resource scheduling information of a first part of the one or more first STAs, and the second control information may include resource scheduling information of a second part of the one or more first STAs, so that the resource scheduling information for the one or more first STAs may be allocated to two pieces of control information, to balance overheads of the two pieces of control information.

In a possible design, the first control information may further include a second indication, used to indicate that data of the one or more first STAs after the first control information is not carried on the primary channel, so that the first STAs determine, after receiving the first control information, that the data for the one or more first STAs is not carried on the primary channel.

In a possible design, the first indication may be indexes of the one or more sub-channels. When the one or more sub-channels are two sub-channels, the first indication includes a sub-channel index of the first sub-channel in the two sub-channels, and a sub-channel index of the second sub-channel in the two sub-channels. The first STAs may quickly obtain, based on the first indication, a channel for carrying the resource scheduling information, and can obtain complete resource scheduling information for the first part channel only by reading resource scheduling information on the sub-channels indicated by the first indication. This improves efficiency of reading the resource scheduling information by the first STAs.

In a possible design, the first control information may include a common information part and a resource scheduling information part, and the first indication may be a bandwidth BW included in the common information part.

In a possible design, a data field of the first data packet includes first trigger information, and a data field of the second data packet includes second trigger information. The first trigger information is used to trigger the one or more first STAs to perform uplink data transmission on the first part channel. The second trigger information is used to trigger the one or more second STAs to perform uplink data transmission on the second part channel. The trigger information is added to a data field part of a hybrid data packet, so that the first STAs and the second STAs whose capability sets are different can be simultaneously triggered to perform uplink data transmission. This improves channel utilization.

According to a second aspect, an embodiment of this application provides another data transmission method of an access point side. The method includes: An access point AP sends a first data packet for one or more first stations STAs on a first part channel of a total channel, and simultaneously sends a second data packet for one or more second stations STAs on a second part channel of the total channel other than the first part channel. The second data packet includes two adjacent signal fields, and information used to indicate the first part channel to the first STAs is carried on four subcarriers in a symbol of each of the two adjacent signal fields. The information carried on the four subcarriers in the symbol of each of the two adjacent signal fields in the second data packet is used to indicate, to the first STAs, that the hybrid data packets are being sent, and control information does not need to be sent in advance, to reduce overheads, and improve hybrid transmission efficiency without affecting parsing of data of the second STAs by the second STAs.

In a possible design, the information indicating the first part channel is specifically: A first value set is carried on four subcarriers in a symbol of the first signal field of the two adjacent signal fields, and a second value set is carried on four subcarriers in a symbol of the second signal field of the two adjacent signal fields, so that the first STAs determine the first part channel based on the first value set and the second value set.

In a possible design, subcarrier indexes of the four subcarriers are [−28, −27, 27, 28].

In a possible design, a maximum of one of the first value set and the second value set is [−1, −1, −1, 1], and the first value set is different from the second value set. The second part channel includes at least a primary channel, and the first part channel includes one or more secondary channels.

According to a third aspect, an embodiment of this application provides a data transmission method of a station side. The method includes: A first STA receives a second data packet on a second part channel including a primary channel. The second data packet includes two adjacent signal fields. Information used to indicate a first part channel to the first STA is carried on four subcarriers in a symbol of each of the two adjacent signal fields. The first STA determines the first part channel based on the information carried on the four subcarriers in the symbol of each of the two adjacent signal fields in the second data packet, and receives the first data packet on the first part channel. The information carried on the four subcarriers in the symbol of each of the two adjacent signal fields in the second data packet is used to indicate, to the first STA, that the hybrid data packets are being sent, and control information does not need to be sent in advance, to reduce overheads, and improve hybrid transmission efficiency without affecting parsing of data of a second STA by the second STA.

In a possible design that the first STA determines the first part channel includes: The first STA performs channel estimation on four subcarriers in a symbol of a first signal field. The first STA performs, based on the channel estimation, demodulation on four subcarriers in a symbol of the second signal field to obtain a third value set, and determines whether the third value set is equal to a second value set. Alternatively, the first STA calculates a difference result between a first value set transmitted on the four subcarriers in the symbol of the first signal field and the second value set transmitted on the four subcarriers in the symbol of a second signal field, and determines whether the difference result is not 0 or is greater than or is greater than or equal to a preset threshold. According to the foregoing determining, the first STA can accurately determine the first part channel.

In a possible design, if the third value set is equal to the second value set or the difference result is greater than 0 or is greater than (or greater than or equal to) the preset threshold, the first STA determines a bandwidth of the second part channel of the second data packet, and determines the first part channel. By using the foregoing determining method, the first STA may accurately determine the first part channel, to parse data of the first STA.

According to a fourth aspect, an embodiment of this application provides a data transmission apparatus. The apparatus is specifically an access point AP. The access point has a function of implementing behavior of the access point in the foregoing method designs. The function may be implemented by hardware, or may be implemented by hardware executing corresponding software. The hardware or the software includes one or more modules corresponding to the foregoing functions.

In a possible design, the access point AP includes a processor and a transceiver. The processor is configured to support the access point in performing the corresponding functions in the foregoing methods. The transceiver is configured to: support the access point in communicating with a first STA and a second STA, and send the control information, the data packets, or instructions in the foregoing methods to the first STA and the second STA. The access point may further include a memory. The memory is configured to be coupled to the processor and store a program instruction and data that are necessary for the access point.

According to a fifth aspect, an embodiment of this application provides a station. The station has a function of implementing behavior of the first STA in the foregoing method designs. The function may be implemented by hardware, or may be implemented by hardware executing corresponding software. The hardware or the software includes one or more modules corresponding to the foregoing functions. The module may be software and/or hardware.

In a possible design, a structure of the station includes a transceiver and a processor. The transceiver is configured to support the first STA in communicating with an access point AP, receiving first control information sent by the AP, and receiving a first data packet sent by the AP on a first part channel. The processor may obtain complete resource scheduling information for one or more first STAs based on the first control information and second control information, to parse a data field of the first data packet. The station may further include a memory. The memory is configured to be coupled to the processor and store a program instruction and data that are necessary for the station.

According to another aspect, an embodiment of this application provides a wireless communications system. The system includes the access point in the foregoing aspect, a first STA, and a second STA. A capability set of the first STA is different from that of the second STA.

According to still another aspect, this application provides a computer-readable storage medium. The computer-readable storage medium stores an instruction, and the instruction may be executed by one or more processors of a processing circuit. When the instruction is run on a computer, the computer is enabled to perform the methods according to the aspects.

According to yet another aspect, this application further provides a computer program product including an instruction. When the computer program product runs on a computer, the computer is enabled to perform the methods in the foregoing aspects.

According to still yet another aspect, this application provides a chip system. The chip system includes a processor, configured to support a data transmission apparatus in implementing functions in the foregoing aspects, for example, generating or processing data and/or information in the foregoing methods. In a possible design, the chip system further includes a memory. The memory is configured to store a program instruction and data that are on for the data transmission apparatus. The chip system may include a chip, or may include a chip and another discrete component.

It may be learned that beneficial effects of the technical solutions provided in the embodiments of this application are as follows:

According to the methods provided in the embodiments of this application, when the data of the second STAs is sent on some channels including the primary channel, data may further be sent to the first STAs on another secondary channel. This improves channel utilization. In addition, an indication indicating one or more sub-channels on which the first STAs can obtain the resource scheduling information is added to control information, so that the first STAs can obtain the resource scheduling information on the indicated one or more sub-channels and parse the data packet of the first STAs. Therefore, channel bandwidth is effectively used, complexity of reading the resource scheduling information by the first STAs is further reduced, transmission efficiency is improved, and a more flexible hybrid transmission mode can be supported.

BRIEF DESCRIPTION OF DRAWINGS

To describe embodiments of the present invention more clearly, the following briefly describes the accompanying drawings required for describing the embodiments. It is clear that a person of ordinary skill in the art may still derive other drawings from these accompanying drawings without creative efforts.

DESCRIPTION OF EMBODIMENTS

Scenarios described in the embodiments of this application are intended to more clearly describe the technical solutions in the embodiments of this application, and does not constitute a limitation on the technical solutions provided in the embodiments of this application. It is clear that the described embodiments are merely some rather than all of the embodiments of the present invention. All other embodiments obtained by a person of ordinary skill in the art based on the embodiments of this application without creative efforts shall fall within the protection scope of this application.

Figure 1:
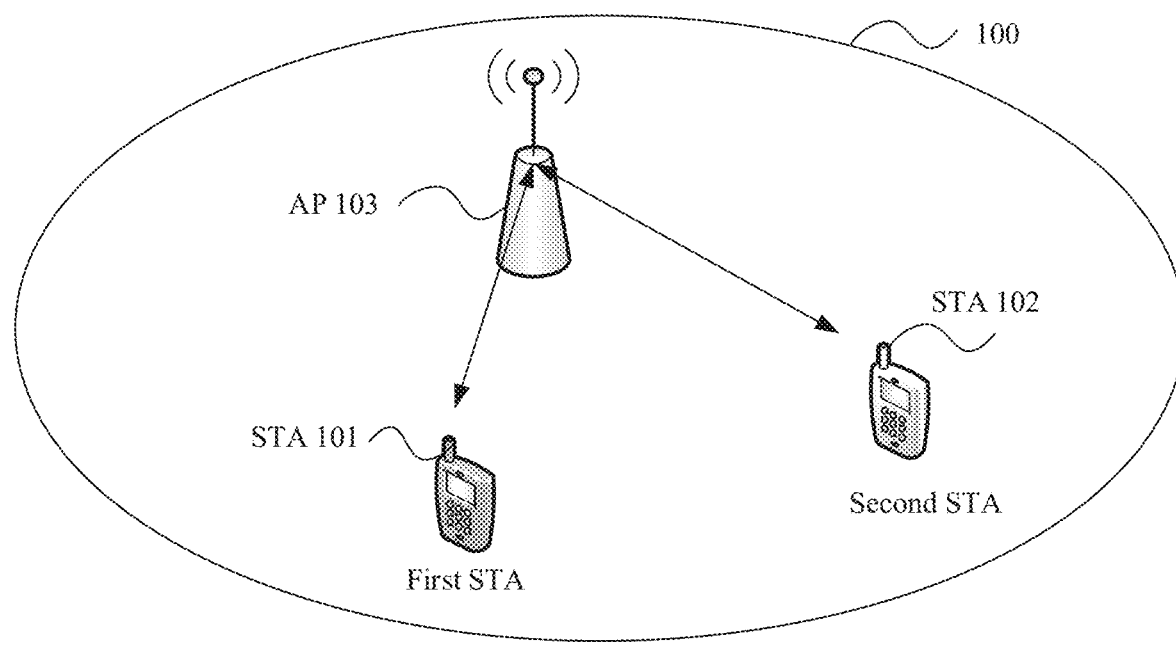
FIG. 1 is a schematic diagram of a possible application scenario according to an embodiment of this application.

FIG. 1 shows a wireless local access network (WLAN for short) communications system 100. The communications system 100 includes an access point AP 103, one or more first STAs 101, and one or more second STAs 102. A capability set of the first STAs 101 is different from that of the second STAs 102. In an example, the one or more first STAs 101 may have a first capability set, and the one or more second STAs 102 may have a second capability set. The one or more first stations STAs 101 that have the first capability set may comply with a first standard, the one or more second station STA 102 having the second capability set may comply with a second standard. In some aspects, the first STAs 101 having the first capability set may be more advanced than the second STAs 102 having the second capability set, and the STAs 102 having the second capability set may be old-fashioned devices. In an example, the first standard may be backward compatible with the second standard. For example, the first standard may be a next-generation wireless communication standard protocol or a next-next-generation wireless communication standard protocol of 802.11ax, and the second standard may be a wireless communication standard protocol such as 802.11a, 802.11g, 802.11n, 802.11ac, or 802.11ax. In addition, the first STAs 101 having the first capability set may support the first standard. The first standard may be backward compatible with the second standard. The second STAs 102 having the second capability set may support both the first standard and the second standard, but work in a second standard mode. The access point AP 103 is an apparatus that has a wireless communication function, has a function of communicating with the one or more first STAs 101, and further has a function of communicating with the one or more second STAs 102. The access point AP 103 may be an AP that performs data transmission by using the 802.11 protocol. In an example, a plurality of stations STAs are connected to the AP over a wireless link that complies with Wi-Fi, to obtain general connectivity to the internet or to another wide area network. In some implementations, an STA may also be used as an AP. It may be understood that, a quantity of APs and a quantity of STAs in the WLAN communications system 100 are merely examples, and do not constitute a limitation on the embodiments of this application.

A person skilled in the art may understand that, in the WLAN communications system, the first STAs 101 and the second STAs 102 in this application may alternatively be various user terminals, user apparatuses, access apparatuses, subscriber stations, subscriber units, mobile stations, user agents, or user equipment that each have a wireless communication function, or have other names. The user terminal may include various handheld devices, vehicle-mounted devices, wearable devices, or computing devices, another processing device connected to a wireless modem, various forms of user equipment (UE for short), a mobile station (MS for short), a terminal, a terminal device, a portable communications device, a handheld device, a portable computing device, an entertainment device, a game device or system, a global positioning system device, or any other suitable device configured to perform network communication by using a wireless medium, and the like that each have a wireless communication function. Herein, for ease of description, the devices mentioned above are collectively referred to as a station or an STA.

The access point AP 103 in this application is an apparatus that is deployed in a wireless communications network to provide a wireless communication function for a station, and may be used as a hub of a WLAN. The apparatus may have a full-duplex function. The access point AP 103 may alternatively be a base station, a router, a gateway, a repeater, a communications server, a switch, a bridge, or the like. The base station may include a macro base station, a micro base station, a relay station, or the like in various forms. For ease of description, the apparatus that provides the wireless communication function and a service for the station STA is collectively referred to as an access point AP.

Figure 2:
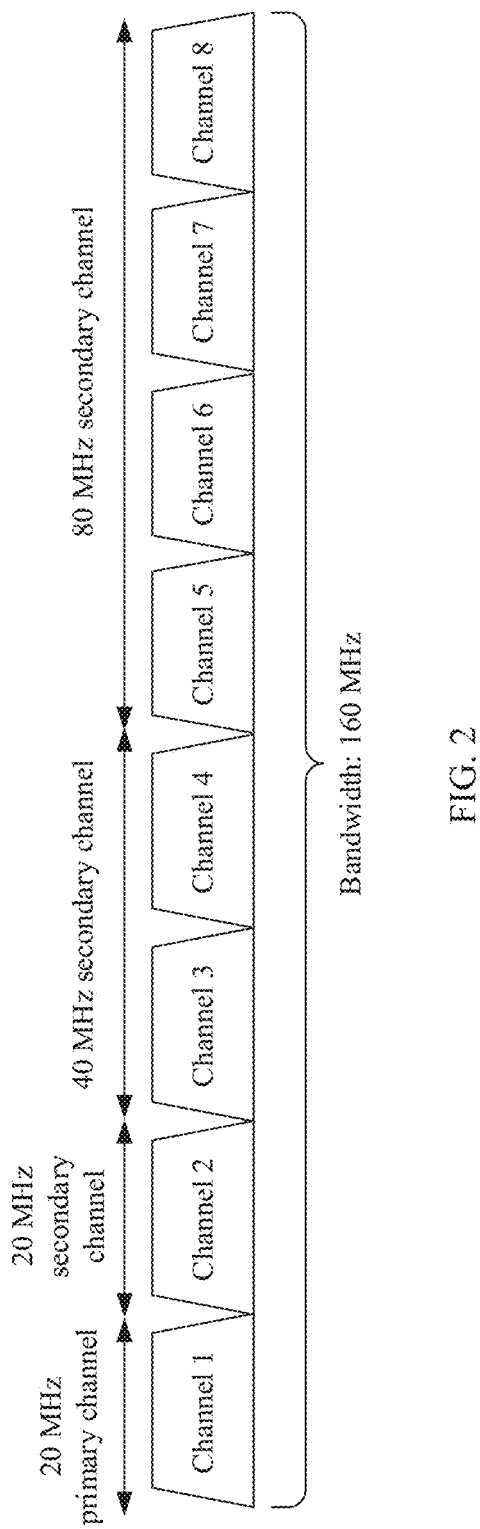
FIG. 2 is a schematic diagram of channel division in an 802.11 system.

In the WLAN, channels are usually classified into a primary channel and a secondary channel, and the secondary channel may include one or more sub-channels. In an example, if division is performed by using 20 MHz as a basic bandwidth unit, when a channel bandwidth is 20 MHz, there is only one primary channel whose bandwidth is 20 MHz. When a channel bandwidth is greater than 20 MHz, one channel whose bandwidth is 20 MHz is a primary channel, and one or more remaining channels whose bandwidth is 20 MHz are secondary channels. For example, as shown in FIG. 2, a channel bandwidth is 160 MHz, channels are sequentially numbered as a channel 1 to a channel 8, and each sequence number represents a 20 MHz channel. The channel 1 represents a 20 MHz primary channel (primary 20 MHz channel, P20 for short). A channel 2 represents a 20 MHz secondary channel (secondary 20 MHz channel, S20 for short). A 40 MHz secondary channel (secondary 40 MHz channel, S40 for short) includes two sub-channels whose bandwidths each are 20 MHz: a channel 3 and a channel 4. An 80 MHz secondary channel (secondary 80 MHz channel, S80 for short) includes four sub-channels whose bandwidths each are 20 MHz: channels 5, 6, 7, and 8. The channels 5 and 6 are adjacent to each other, the channels 6 and 7 are adjacent to each other, and the channels 7 and 8 are adjacent to each other. It may be understood that one 40 MHz secondary channel means that a bandwidth of the secondary channel is 40 MHz, and the secondary channel includes two 20 MHz sub-channels.

It should be understood that the channels 1 to 8 may be arranged in a manner shown in FIG. 2, or may be arranged in a plurality of other manners. This is not limited in the present invention. For convenience of description, in all embodiments of the present invention, for the channel division in the WLAN, the channel 1 is used as the primary channel. It should be noted that an 802.11 system supports various channel bandwidths having different values. The bandwidth may be one of a 20 MHz bandwidth, a 40 MHz bandwidth, an 80 MHz bandwidth, a 160 MHz bandwidth, or an 80 MHz+80 MHz bandwidth. In a next-generation 802.11 standard, the channel bandwidth may alternatively be 320 MHz or another channel bandwidth. A channel division method of the channel bandwidth may be similar to that of the 160 MHz channel. Details are not described herein again.

It should be noted that, based on an operating principle of a transceiver, "simultaneously" in the embodiments is essential, and processing on the foregoing different channels does not need to be strictly limited to have no time difference, provided that the foregoing processing is basically the same in terms of a time dimension. In addition, in the solutions of the embodiments of this application, it is beneficial that a plurality of stations simultaneously communicates with the AP. For example, this may allow a plurality of STAs to receive data sent by the AP in relatively short time, and can send data to the AP with a relatively short delay. This may also allow the AP to communicate with a larger quantity of devices in general, and may also improve bandwidth use efficiency. By using multiple access communication, on a bandwidth of 80 MHz, the AP can perform multiplexing transmission on an OFDM symbol at a time for, for example, four devices, where each device uses a bandwidth of 20 MHz. Therefore, multiple access may be beneficial in some aspects, because the multiple access may allow the AP to use a spectrum available to the AP more efficiently.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification indicates an "or" relationship between the associated objects.

The following describes the solutions in the embodiments with reference to more accompanying drawings. The aspects described in this specification may be used as a part of the IEEE 802.11 protocol, especially the 802.11 protocol that supports orthogonal frequency division multiple access (OFDMA) communication.

Figure 3:
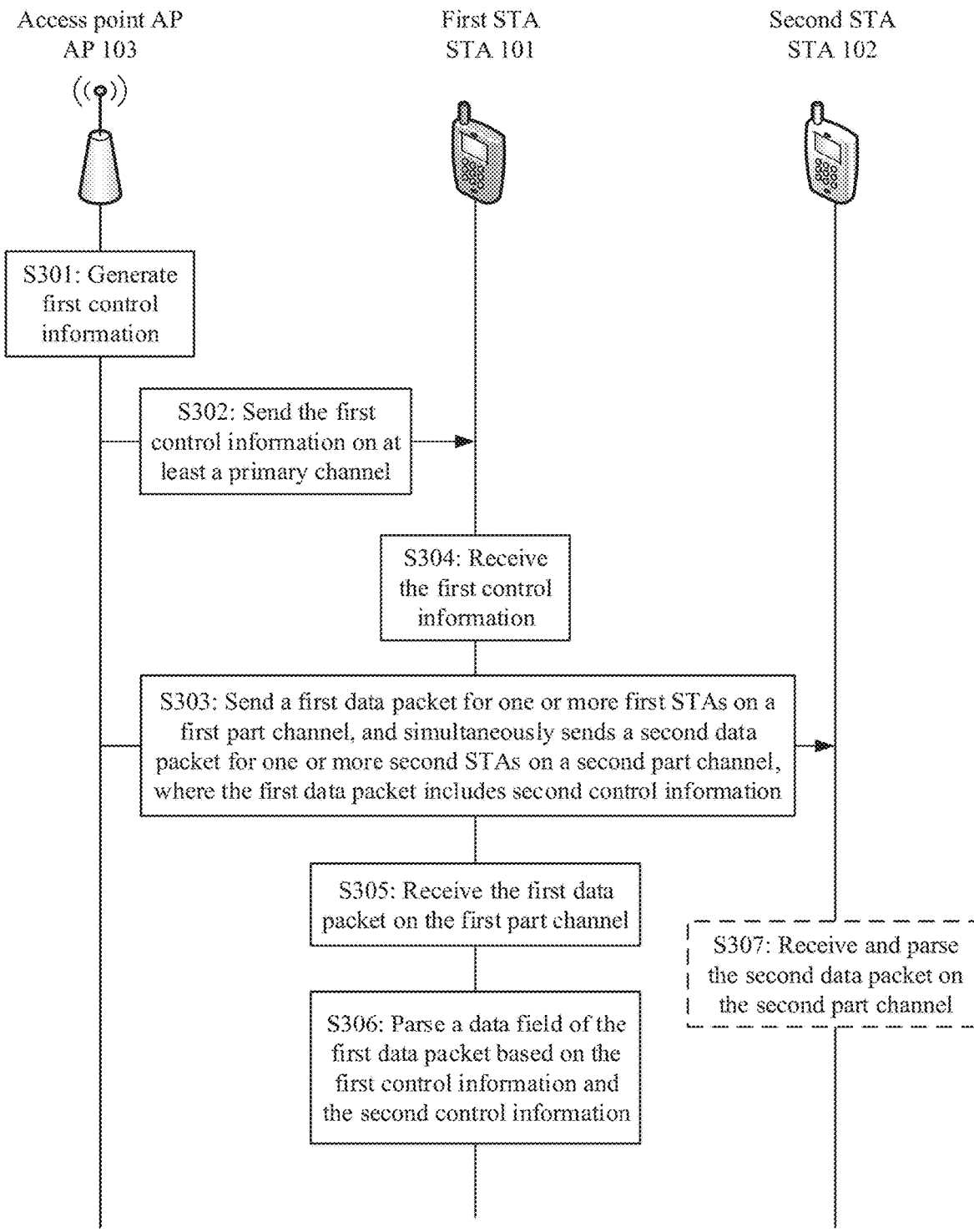
FIG. 3 is a schematic flowchart of a data transmission method according to an embodiment of this application.

FIG. 3 is a schematic flowchart of a data transmission method according to an embodiment of this application.

S301: An access point AP generates first control information for one or more first STAs. The first control information includes a first indication, used to indicate one or more sub-channels.

S302: The access point AP sends the first control information on at least a primary channel.

Before sending the first control information, the AP may first perform channel carrier sense. When the AP learns through monitoring that a total channel is completely idle or that the primary channel and some secondary channels in a total channel are idle, the AP may perform multi-channel hybrid transmission. The total channel includes the primary channel and one or more secondary channels, and one secondary channel may include one or more sub-channels.

Specifically, the first control information may be carried in a scheduling frame. The scheduling frame may be a MAC (media access control) frame, or may be one of a control frame, a management frame, or a data frame.

S303: The access point AP sends a first data packet for the one or more first STAs on a first part channel of a total channel, and simultaneously sends a second data packet for one or more second STAs on a second part channel of the total channel.

The first data packet includes second control information for the one or more first STAs. The first part channel includes one or more sub-channels, the one or more sub-channels carry the second control information, the second part channel includes the primary channel, and the first part channel does not overlap with the second part channel. The first control information and/or the second control information further include/includes resource scheduling information for the one or more first STAs. A capability set of the first STAs is different from that of the second STAs.

After sending the first control information, the access point AP sends the first data packet for the one or more first STAs on the first part channel of the total channel, and simultaneously sends the second data packet for one or more second STAs on the second part channel of the total channel.

It may be understood that, for the AP with a flexible duplex function, when sending the first data packet on the first part channel of the total channel, the AP may further receive the second data packet on the second part channel of the total channel. The second data packet includes uplink data of the one or more second STAs.

S304: The first STAs receive the first control information for the one or more first stations STAs on at least the primary channel.

S305: The first STAs receive the first data packet on the first part channel of the total channel. The first data packet includes second control information for the one or more first STAs. The first part channel includes one or more sub-channels, and the one or more sub-channels carry the second control information. The first control information and/or the second control information further include/includes resource scheduling information for the one or more first STAs.

S306: The first STAs parse a data field of the first data packet based on the first control information and the second control information.

In an example, the first indication in the first control information may be a bitmap including one or more bits, to indicate the one or more sub-channels. Each bit is corresponding to one 20 MHz channel, and the first bit corresponds to the primary channel. The first indication may be further reused to indicate a bandwidth of the total channel. For example, when the bitmap of the first indication is 0011, the indicated one or more sub-channels are the channels 3 and 4 in FIG. 2, and a bandwidth of a total channel is 80 MHz. For another example, when the first indication bitmap is 00111100, the indicated one or more sub-channels are the channels 3, 4, 5, and 6 in FIG. 2, and a bandwidth of a total channel is 160 MHz.

In another example, the first indication may be index information of the one or more sub-channels. When the one or more sub-channels are two sub-channels, the first indication may include index information of the first sub-channel in the two sub-channels, and index information of the second sub-channel in the two sub-channels.

Optionally, the first control information may further include a second indication, used to indicate that data of the one or more first STAs after the first control information is not carried on the primary channel. It may be understood that the second indication may also be referred to as a hybrid transmission indication identifier, and is used to indicate that the AP performs hybrid data transmission after indicating the first control information to the first STAs.

In an example, the second indication may include one or more bits, and is used to indicate, to one or more first STAs, that data of the one or more first STAs after the first control information is not carried on the primary channel. For example, when the second indication includes 1 bit, and a value of the second indication is 0, it indicates that the data for the one or more first STAs is not carried on the primary channel. When the value of the second indication is 1, it indicates that the data for the one or more first STAs is carried on the primary channel. In other words, hybrid transmission is not performed.

It may be understood that the first control information may alternatively not include the second indication information, but is specified by using a protocol. For example, it may be specified that after the first STAs receive the first control information, the first STAs determine that the AP performs hybrid transmission after sending the first control information, and the primary channel does not carry the data of the first STAs.

Figure 4A:
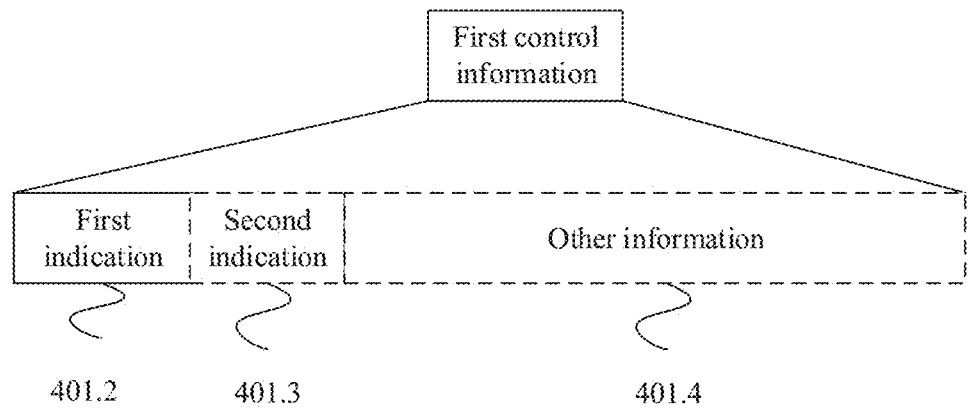
FIG. 4a is a schematic diagram of one type of first control information according to an embodiment of this application.

In an optional manner, a structure of the first control information may be shown in FIG. 4a. First control information 401.1 may include a first indication 401.2 and a second indication 401.3, and may further include other information 401.4. The other information 401.4 may include, but is not limited to, one or more of the following or any combination of the following:

an uplink/downlink indication, a basic service set color BSS Color (Basic service set color), a spatial reuse parameter, and a modulation and coding scheme.

Specifically, the uplink/downlink indication is used to indicate that a data packet sent after the first control information is an uplink data packet or a downlink data packet. The uplink/downlink indication indicates that at least the first data packet is uplink or downlink, and may further indicate that the second data packet is uplink or downlink.

In a system in which flexible duplex is not allowed, the first data packet and the second data packet have a same direction. A same indication may be reused to indicate that the first data packet and the second data packet are uplink data packets, or the first data packet and the second data packet are downlink data packets. In a system in which flexible duplex is allowed, the transmission direction may alternatively be: the first data packet is an uplink data packet, and the second data packet is a downlink data packet; or the first data packet is a downlink data packet, and the second data packet is an uplink data packet.

Specifically, the basic service set color BSS Color is used to identify a basic service set BSS (Basic service set) in which a first STA that complies with a first standard is located.

A bandwidth of the second part channel of the total channel helps the first STAs quickly determine, with reference to a bandwidth of the total channel, a channel on which the first data packet of the first STAs is located and a channel on which the second control information of the first STAs is located.

Figure 4B:
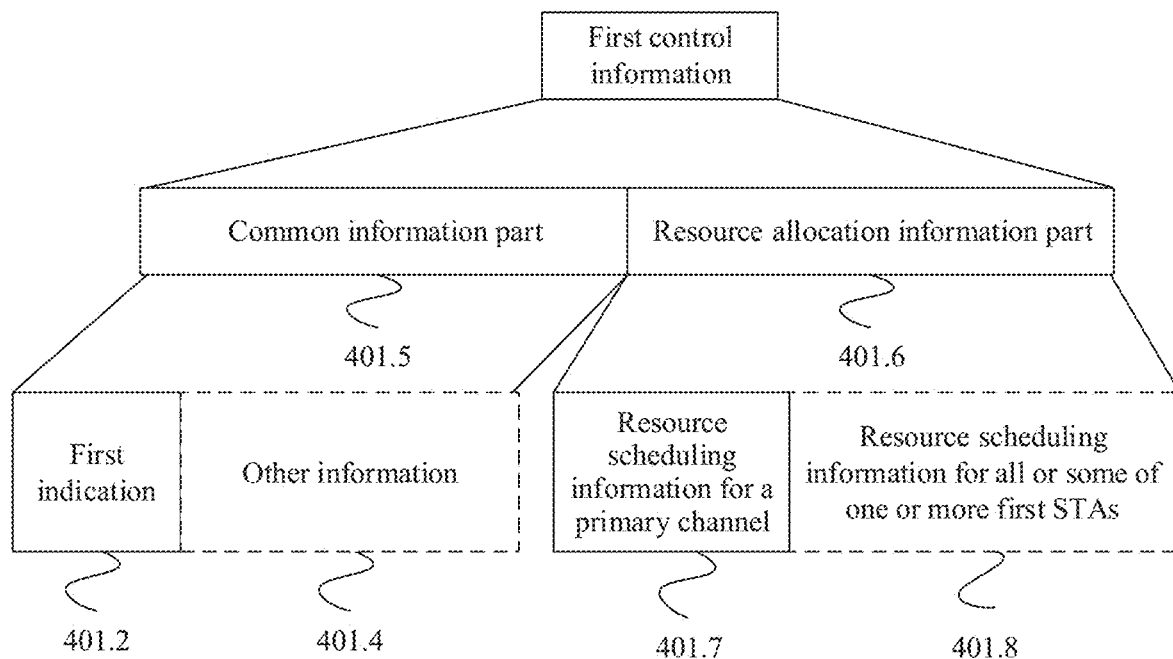
FIG. 4b is a schematic diagram of another type of first control information according to an embodiment of this application.

In another optional manner, a structure of the first control information may be shown in FIG. 4b. The first control information may include a common information part 401.5 and a resource scheduling information part 401.6. The common information part 401.5 may include the first indication 401.2, and may optionally include the foregoing other information 401.4. The resource scheduling information part 401.6 may optionally include resource scheduling information 401.7 for the primary channel, and may optionally include resource scheduling information 401.8 for all or some of the one or more first STAs.

The resource scheduling information 401.7 for the primary channel may include resource unit allocation information of the primary channel and information about a scheduled station on a resource unit of the primary channel. The information about the scheduled station may include information such as an association identifier (AID for short) of the scheduled station, a number of space-time streams (NSTS for short) of the scheduled station, whether beamforming is used for sending, and a modulation and coding scheme MCS. In an example, the second indication may include: The resource unit allocation information of the primary channel indicates that a resource unit allocated to the one or more first STAs on the primary channel is empty. For example, a value of the resource unit allocation information may be set to 01110001, to indicate that a resource unit (RU for short) on the primary channel is an empty 242-tone (subcarrier) RU. In other words, the primary channel does not carry the data of the first STAs complying with the first standard. In another example, the second indication may include: The AID of the scheduled station on the primary channel is a reserved value. For example, an AID of each STA of one or more stations scheduled by using the resource scheduling information of the primary channel may be set to 2046, and the first STAs cannot identify the reserved station identifiers. In this case, it is determined that the one or more first STAs are not scheduled on the primary channel to perform data transmission. In other words, the primary channel does not carry the data of the one or more first STAs.

The first control information and/or the second control information further include/includes the resource scheduling information for the one or more first STAs. The resource scheduling information for the one or more first STAs may include resource unit allocation information of the one or more first STAs and station information of the one or more first STAs. Similarly, the station information may include an association identifier AID and the like.

It should be noted that, in the 802.11 protocol in which OFDMA is used, an OFDMA system includes a plurality of subcarriers. The plurality of subcarriers are divided into a plurality of groups of subcarriers. One group of subcarriers may form one resource unit (RU). For example, in the 802.11ax protocol, one resource unit (RU for short) includes at least 26 subcarriers, and a resource unit including 26 subcarriers is referred to as a 26-tone RU. A plurality of stations may be scheduled on one resource unit.

In an optional manner, that at least one of the first control information and the second control information includes the resource scheduling information for the one or more first STAs is specifically: The resource scheduling information 401.8 of the first control information includes the resource scheduling information for the one or more first STAs, and the second control information also includes the resource scheduling information for the one or more first STAs. Alternatively, the first control information does not include the resource scheduling information for the one or more first STAs, that is, does not include the resource scheduling information 401.8, and the second control information includes the resource scheduling information for the one or more first STAs. For example, when the first data packet includes data of four first STAs, and the four first STAs are respectively an STA 1, an STA 2, an STA 3, and an STA 4, the resource scheduling information 401.8 of the first control information includes resource scheduling information for the STA 1, the STA 2, the STA 3, and the STA 4, and the second control information also includes the resource scheduling information for the STA 1, the STA 2, the STA 3, and the STA 4.

In another optional manner, the first control information further includes resource scheduling information for a first part of the one or more first STAs, and the second control information includes resource scheduling information for a second part of the one or more first STAs. It may be understood that an intersection set of the first part of the first STAs and the second part of the first STAs may be empty or may not be empty, but a union set of the first part of the first STAs and the second part of the first STAs is the one or more first STAs. For example, the one or more first STAs are an STA 1, an STA 2, an STA 3, and an STA 4. In this case, the resource scheduling information 401.8 of the first control information includes resource scheduling information for the STA 1 and the STA 2, and the second control information includes resource scheduling information for the STA 3 and the STA 4. For another example, the resource scheduling information 401.8 of the first control information includes resource scheduling information for the STA 1, the STA 2, and the STA 3, and the second control information includes resource scheduling information for the STA 2, the STA 3, and the STA 4. It may be understood that the structure of the first control information may alternatively be in another form. The structures of the first control information shown in FIG. 4a and FIG. 4b are merely examples, and do not constitute a limitation.

The first data packet includes a physical layer preamble that complies with the first standard and a data field for the one or more first STAs. The second data packet includes a physical layer preamble that complies with a second standard and a data field for the one or more second STAs.

Optionally, a symbol length of the data field of the first data packet of the first STAs may be the same as a symbol length of the data field of the second data packet of the second STAs.

In an example, if the second STAs are stations that comply with a standard protocol such as 802.11a, 802.11g, 802.11n, or 802.11ac, the symbol length of the data field of the second data packet is 1X, and the symbol length of the data field of the first data packet is also 1X.

In another example, if the second STAs are HE STAs (High Efficiency Station) that comply with the 802.11ax standard protocol, the symbol length of the data field of the second data packet is 4X, and the symbol length of the data field of the first data packet is also 4X.

The second control information is included in the first data packet sent on the first part channel of the total channel, and the second control information may be included in a physical layer preamble that complies with the first standard and that is carried on the one or more sub-channels indicated by the first indication. It may be understood that the second control information may be repeated on another sub-channel that is on the first part channel and that is other than the one or more sub-channels indicated by the first indication.

Figure 4C:
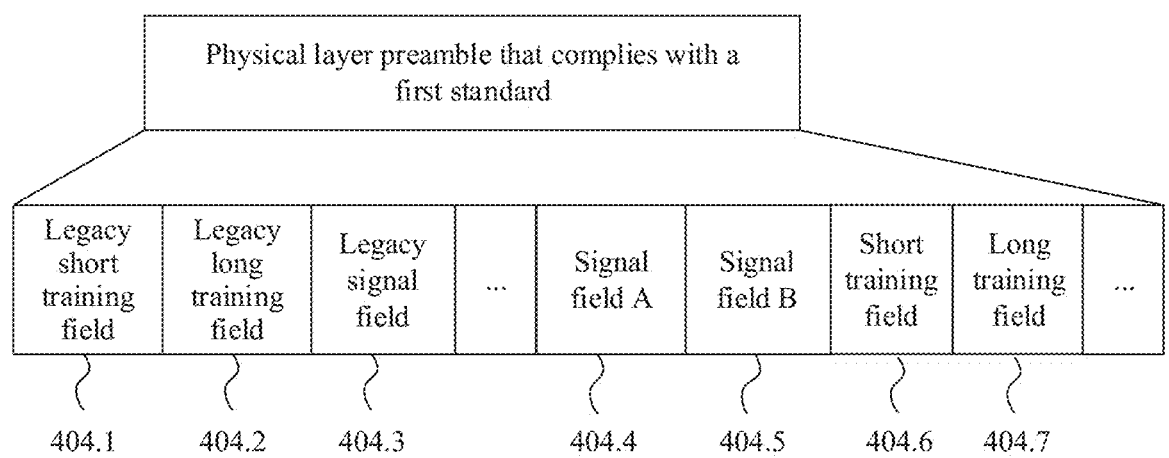
FIG. 4c is a schematic diagram of a physical layer preamble that complies with a first standard according to an embodiment of this application.

As shown in FIG. 4c, the physical layer preamble that complies with the first standard may include a legacy short training field 404.1 (L-STF for short), a legacy long training field 404.2 (L-LTF for short), and a legacy signal field 404.3 (L-SIG for short), to ensure backward compatibility. The physical layer preamble that complies with the first standard may further include a signal field A (SIG-A for short) 404.4 and a signal field B (SIG-B for short) 404.5, and carry related signaling information and the resource scheduling information that are required for reading data by the first STAs. In a case of multiple-input multiple-output MIMO (Multiple-Input Multiple-Output), a short training sequence field (short training sequence field, STF for short) may be used to perform AGC (Automatic Gain Control), and a long training sequence field (LTF for short) may be used to perform channel measurement. The long training sequence field LTF may include a plurality of LTF symbols that are used for performing channel measurement on a plurality of space-time streams.

In an example, the second control information may be included in the signal field B 404.5. For example, the second control information may be a resource unit allocation field in the signal field B.

The first STAs receive the first control information on at least the primary channel. The first STAs may determine, based on the first indication in the first control information, that data of the one or more first STAs after the first control information is not carried on the primary channel, or determine that the AP performs hybrid transmission after the first control information. Moreover, the first STAs determine, based on the first indication, the one or more sub-channels that include the second control information and that are indicated by the first indication, obtain the second control information on the indicated one or more sub-channels, and obtain all resource scheduling information based on the first control information and/or the second control information. For example, when the first control information includes the resource scheduling information of the first part of the one or more first STAs, and the second control information includes the resource scheduling information of the second part of the one or more first STAs, the first STAs obtain all the resource scheduling information with reference to the first control information and the second control information. Further, the first STAs determine, based on all the obtained resource scheduling information, information about a resource unit scheduled for the first STAs, to parse the data field in the first data packet to obtain a data part corresponding to the first STAs.

Figure 4D:
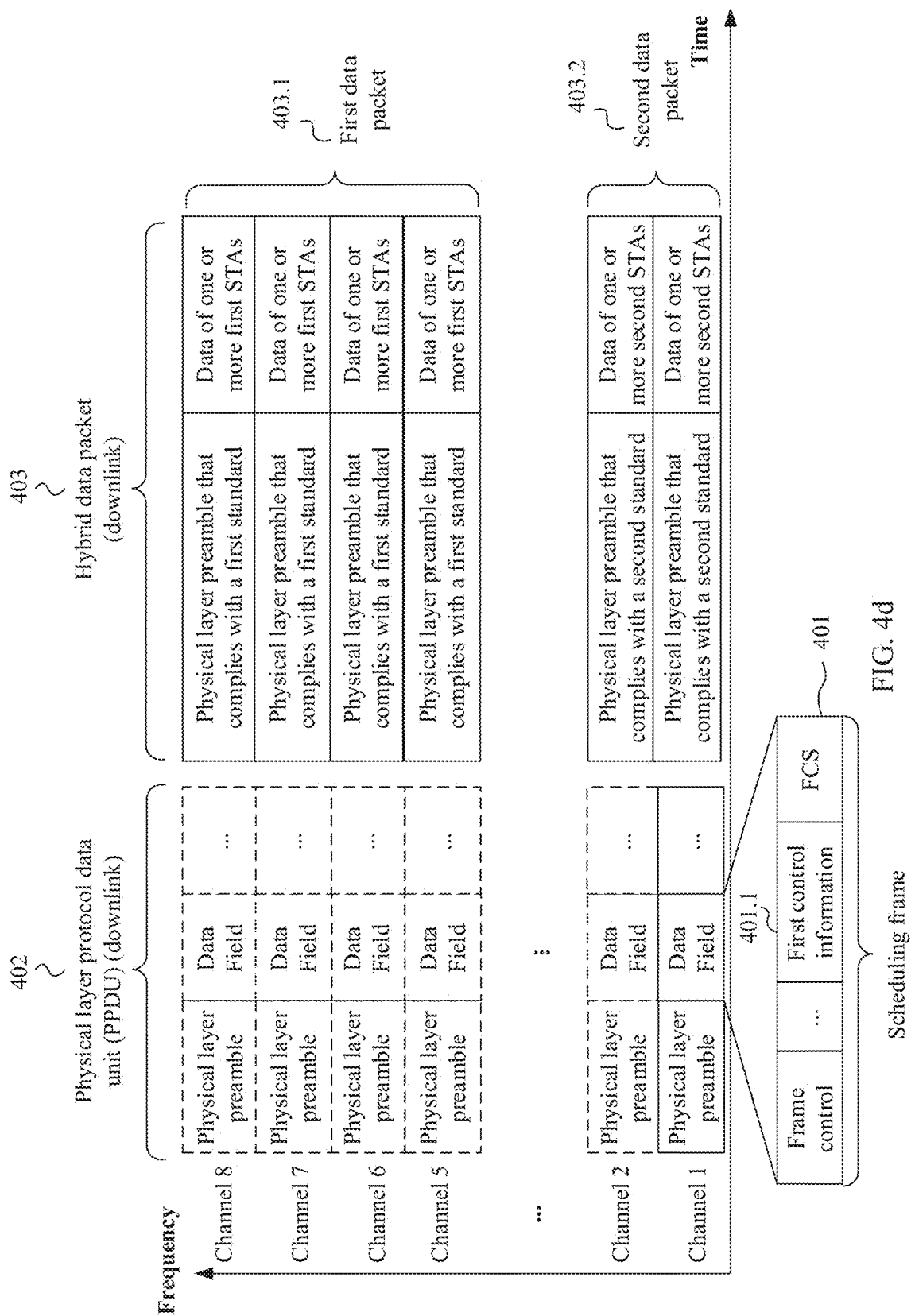
FIG. 4d is a schematic diagram of a time sequence of a data transmission method according to an embodiment of this application.

For example, as shown in FIG. 4d, an example in which the total channel is 160 MHz is used for description. The total channel includes a 20 MHz primary channel, a 20 MHz secondary channel, a 40 MHz secondary channel (including two 20 MHz sub-channels: a channel 3 and a channel 4), and an 80 MHz secondary channel (including four 20 MHz sub-channels: a channel 5, a channel 6, a channel 7, and a channel 8). In addition, it is assumed that the AP schedules four first STAs: the STA 1, the STA 2, the STA 3, and the STA 4. The AP generates the first control information 401.1. The first control information 401.1 includes the first indication and resource unit allocation information of the STA 1 and the STA 2 in the one or more first STAs, and optionally includes the second indication. The one or more sub-channels indicated by the first indication are the channel 6 or the channel 8. The first control information 401.1 is carried in a MAC scheduling frame 401. The scheduling frame 401 is carried in a data field part of a physical layer protocol data unit PPDU (physical layer protocol data unit) 402. The AP may send the PPDU 402 on at least the primary channel. Further, after the AP sends the PPDU 402 that carries the first control information, the AP may send a second data packet 403.2 to at least one second STA on the 20 MHz primary channel (a channel 1) and the 20 MHz secondary channel (a channel 2), or may send the second data packet (not shown in the accompanying drawing) only on the 20 MHz primary channel (the channel 1). The second data packet 403.2 includes physical layer preambles that comply with the second standard and data fields of one or more second STAs. In addition, the AP sends a first data packet 403.1 for one or more first STAs on a first part channel (the channels 5, 6, 7, and 8) of the total channel. The first part channel includes the one or more sub-channels (the channel 6 and the channel 8) indicated by the first indication. The first data packet 403.1 includes physical layer preambles that comply with the first standard and data fields of the one or more first STAs. In addition, the physical layer preambles that are carried on the channel 6 and the channel 8 and that comply with the first standard include second control information. The second control information includes resource scheduling information for the STA 3 and the STA 4 in the one or more first STAs. A first STA receives the PPDU 402 carrying the first control information, and the first STA obtains the first control information 401.1 after parsing the PPDU 402. The first STA determines, based on the first or second indication in the first control information 401.1, that data of the one or more first STAs after the first control information is not carried on the primary channel. The first STA receives the first data packet on the first part channel (the channels 5, 6, 7, and 8) of the total channel, and obtains, based on the first indication in the first control information, the second control information on the sub-channel 6 or sub-channel 8 indicated by the first indication. Further, the first STA (for example, the STA 1) obtains, based on the first control information and the second control information, complete resource scheduling information for the one or more first STAs, and determines a resource unit for transmitting the data of the first STA, to parse the data field of the first data packet and obtain the data of the first STA.

In this embodiment, when the AP performs multi-channel hybrid transmission, especially when the AP flexibly transmits the data of the one or more first STAs on non-consecutive secondary channels, indication information is included in the first control information, so that the first STAs can quickly obtain all resource scheduling information for the first STAs during hybrid transmission, to reduce complexity of obtaining the resource scheduling information by the first STAs.

In another embodiment of this application, based on S301 and S302, a data field of a first data packet sent by the AP may include first trigger information. The first trigger information is used to trigger the one or more first STAs to perform uplink data transmission on a first part channel of a total channel. A data field of a second data packet sent by the AP may include second trigger information. The second trigger information is used to trigger one or more second STAs to perform uplink data transmission on a second part channel of the total channel.

According to the method in S304, S305, and S306, the first STAs parse the data field of the first data packet, and obtain the first trigger information included in the data field. Further, based on the first trigger information, the one or more first STAs send uplink data on the first part channel by using a specified resource unit.

In addition, after receiving the second data packet on the second part channel, the one or more second STAs may also send, based on the second trigger information in the data field, uplink data on the second part channel by using a specified resource unit.

The second trigger information may include a common information field and one or more user information fields. The common information field may include a bandwidth subfield, used to indicate a bandwidth used by the one or more second STAs to send an uplink data packet. Each user information field may include information such as an association identifier AID of a scheduled second STA, resource unit scheduling information (RU Allocation), and a modulation and coding scheme MCS. The resource scheduling information corresponding to the user information field is used to indicate a resource unit, on at least the primary channel, that is allocated to the second STA corresponding to the AID. Therefore, the one or more second STAs may be scheduled to perform uplink data transmission on at least the primary channel.

Similarly, the first trigger information may also include a common information field and one or more user information fields. The common information field may include a bandwidth subfield, used to indicate a bandwidth used by the one or more first STAs to send an uplink data packet. Each user information field may include information such as an association identifier AID of a scheduled first STA, resource scheduling information (RU Allocation), and a modulation and coding scheme MCS. The resource scheduling information corresponding to the user information field is used to indicate a resource unit, on the first part channel of the total channel that is allocated to the first STA corresponding to the AID. Therefore, the one or more first STAs may be scheduled to perform uplink data transmission on the first part channel.

In another embodiment of this application, the first control information may be a signal field that complies with the first standard, and a structure of the signal field that complies with the first standard may be similar to a structure of a signal field that complies with the second standard.

The first control information may include a field similar to an HE SIG-B (High efficiency SIG-B) defined in the 802.11ax standard, and the first control information may include a common block field (Common Block field) and a user specific field (User Specific field) field. The common block field is mainly used to indicate resource unit allocation, and includes a resource unit allocation subfield (Resource Unit Allocation subfield). The resource unit allocation subfield may be used to indicate resource unit allocation in frequency domain and a quantity of STAs in each resource unit.

A station-by-station field in the user-specific field may include information such as an identifier (which is usually an association identifier AID of an STA) of a station that can be scheduled on a corresponding resource unit, a number of space-time streams (number of spatial-time streams) of a single user, a transmit beamforming indication (Transmit Beamforming), a modulation and coding scheme MCS, and dual-carrier modulation (DCM for short).

In an example, the second indication may be indicated by a resource unit allocation subfield (Resource Unit Allocation subfield). For example, a value of a resource unit allocation subfield for the 20 MHz primary channel may be set to 01110001, to indicate that a resource unit RU (Resource Unit) on the primary channel is an empty 242-tone (subcarrier) RU. In other words, the primary channel does not carry the data of the first STAs complying with the first standard.

In another example, the second indication may be indicated by an association identifier AID (Association Identifier) of a station corresponding to each resource unit in the resource unit allocation field on the 20 MHz primary channel. Specifically, the AID of each station may be set to a reserved value. For example, the AID of each STA may be set to 2046, to implicitly indicate that the RU on the primary channel is empty. In other words, the primary channel does not carry the data of the first STAs complying with the first standard.

The first control information may further include a bandwidth BW (bandwidth), an uplink/downlink indication, a basic service set color BSS Color, a spatial reuse parameter (SRP for short), a quantity of symbols of a signal field B (SIG-B for short), a modulation and coding scheme MCS used for the SIG-B, and the like. The first control information may further include a bandwidth occupied by second data of the second STAs, so that the first STAs quickly determine a channel on which the first data packet of the first STAs includes the second control information.

In an example, the first indication in the first control information may be a bandwidth BW. Similar to a bandwidth function defined in the 802.11ax standard, the bandwidth BW in the first control information may be used to indicate a bandwidth of the total channel. A difference lies in that, the bandwidth BW in the first control information is further used to indicate the one or more sub-channels that carry the second control information, so that the first STAs obtain the second control information on the one or more sub-channels, to obtain complete resource indication information, and parse the data field of the first data packet.

Specifically, when values of the bandwidth BW are different, the sub-channels that carry the second control information and that are indicated by the first indication are different.

When the value of the bandwidth BW is a first value, it indicates that the bandwidth of the total channel is 40 MHz. The total channel is divided into a 20 MHz primary channel P20 and a 20 MHz secondary channel S20, and a sub-channel indicated by the first indication is S20 (the channel 2). Specifically, the AP sends the second data packet for the one or more second STAs on P20, and the AP sends the first data packet including the second control information on S20. For example, this is shown by BW=1 in FIG. 5A.

When the value of the bandwidth BW is a second value, it indicates that the bandwidth of the total channel is 80 MHz. The total channel is divided into a 20 MHz primary channel P20, a 20 MHz secondary channel S20, and a 40 MHz secondary channel S40. Based on a bandwidth requirement of the second STAs, the AP may select P20 to transmit the second data packet for the one or more second STAs, that is, a bandwidth corresponding to the second STAs is 20 MHz; or select P20 and S20 to transmit the second data packet for the one or more second STAs, that is, an allocated bandwidth corresponding to the second STAs is 40 MHz. The AP may select remaining consecutive channels that are not occupied by the second STAs, to send the first data packet for the one or more first STAs. For example, this is shown by BW=2 in FIG. 5A.

When the value of the bandwidth BW is a third value, it indicates that the bandwidth of the total channel is 160 MHz or 80 MHz+80 MHz. The total channel is divided into a 20 MHz primary channel P20, a 20 MHz secondary channel S20, a 40 MHz secondary channel S40, and an 80 MHz secondary channel S80. The AP selects some channels including the primary channel to send the second data packet for the one or more second STAs, and the AP selects remaining consecutive channels that are not occupied by the second STAs, to transmit the first data packet for the one or more first STAs. For example, this is shown by BW=3 in FIG. 5A.

When the value of the bandwidth BW is a fourth value, it indicates that the bandwidth of the total channel is 80 MHz. The total channel is divided into a 20 MHz primary channel (P20), a 20 MHz secondary channel S20, and a 40 MHz secondary channel S40. The AP may send the second data packet for the one or more second STAs on P20 or P20 and S20. A preamble of the data packet on S20 may be punctured, and a bandwidth corresponding to the second STAs is 20 MHz or 40 MHz. The AP selects a remaining channel that is not occupied by the second STAs, to send the first data packet for the one or more first STAs. For example, this is shown by BW=4 in FIG. 5A.

When the value of the bandwidth BW is a fifth value, it indicates that the bandwidth of the total channel is 80 MHz. The total channel is divided into a 20 MHz primary channel P20, a 20 MHz secondary channel S20, and a 40 MHz secondary channel S40. On one of two 20 MHz sub-channels in S40, a preamble is punctured. The AP may select P20 to transmit the second data packet for the one or more second STAs, and a bandwidth corresponding to the second STAs is 20 MHz. The AP may select S20 or S20 and a 20 MHz sub-channel that is in S40 and on which a preamble is not punctured, to transmit the first data packet for the one or more first STAs. For example, this is shown by BW=5 in FIG. 5A and FIG. 5B.

When the value of the bandwidth BW is a sixth value, it indicates that the bandwidth of the total channel is 160 MHz or 80 MHz+80 MHz, and a preamble is punctured on S20. In this case, the AP may transmit the second data packet for the one or more second STAs on P20 or P20 and S20, a bandwidth corresponding to the second STAs is 20 MHz or 40 MHz. The AP selects at least one secondary channel that is not occupied by the second STAs, to send the first data packet for the one or more first STAs. For example, this is shown by BW=6 in FIG. 5B.

When the value of the bandwidth BW is a seventh value, it indicates that the bandwidth of the total channel is 160 MHz or 80 MHz+80 MHz. On any 20 MHz channel in S40, a preamble is punctured. The AP may select P20 to send the second data packet for the one or more second STAs, and a bandwidth corresponding to the second STAs is 20 MHz. The AP may select S20 or S20 and a 20 MHz sub-channel that is in S40 and on which a preamble is not punctured, to send the first data packet for the one or more first STAs. For example, a hybrid transmission mode may be shown by BW=7 in FIG. 5B.

Optionally, when the value of the bandwidth BW is the first value, the second value, or the third value, the first control information may further include a bandwidth occupied by the second data packet. Further, the first STAs may determine, based on the bandwidth BW included in the first control information and the bandwidth of the second data packet, a secondary channel occupied by the first data packet of the first STAs.

Figure 5A:
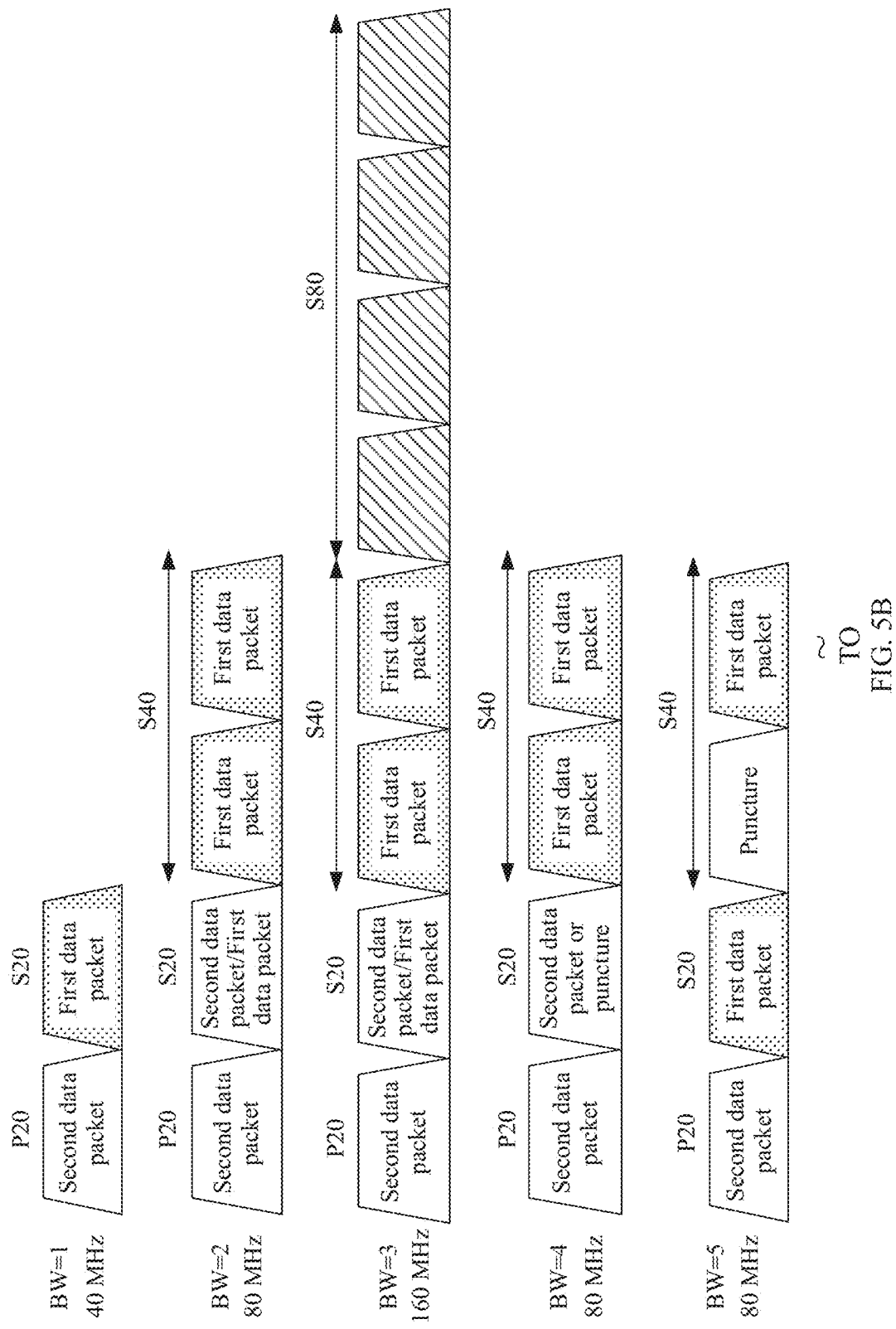
FIG. 5A and FIG. 5B are a channel indication diagram according to an embodiment of this application.
Figure 5B:
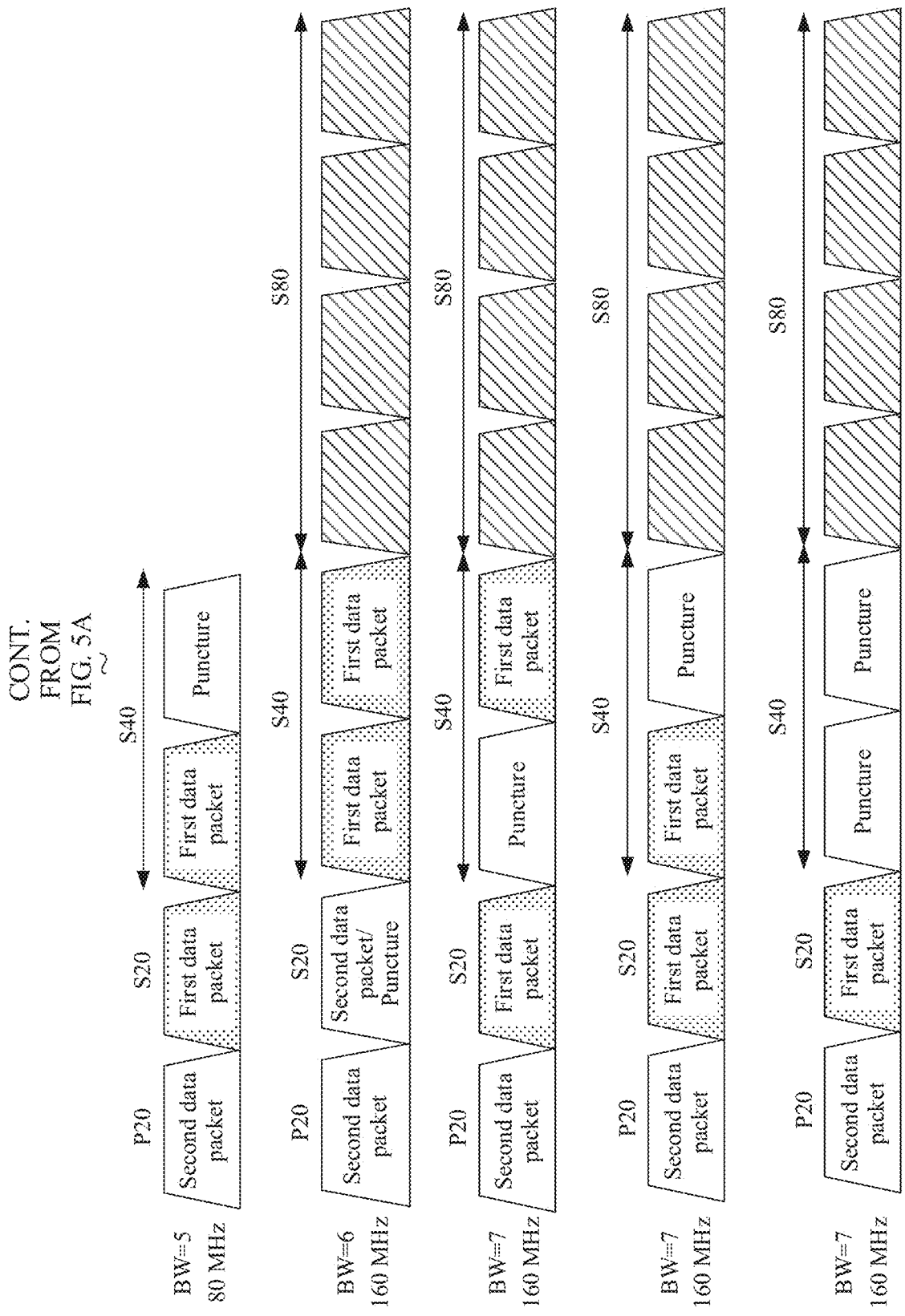

It may be understood that the value of the bandwidth BW and a meaning corresponding to the bandwidth BW may be interchangeable. In addition, if the bandwidth of the total channel is 160 MHz or 80 MHz+80 MHz, the AP may alternatively transmit the first data packet for the one or more first STAs on S80; or transmit the first data packet for the one or more first STAs on any one or more 20 MHz sub-channels in S80 (where this situation is not shown in FIG. 5A and FIG. 5B). In addition, it should be noted that FIG. 5A and FIG. 5B are merely an example, and does not show all combinations of one or more sub-channels indicated by all possible values of the bandwidth BW. In addition, in addition to the value of the bandwidth BW, more other values may alternatively be included to indicate more secondary channel combination modes. For example, when the value of the bandwidth BW is an eighth value, it indicates that the bandwidth of the total channel is 320 MHz. For a combination of secondary channels that are indicated by the eighth value and that are used to transmit the first data packet including the second control information, refer to the foregoing manners. This is not specifically limited in this embodiment.

Similar to S303, S304, and S305, after receiving the first control information, the first STAs learn, based on the first control information, that data of the first STAs after the first control information is not carried on the primary channel, and then obtain, based on the first indication included in the first control information, the second control information on the one or more sub-channels indicated by the first indication. The first STAs obtain complete resource scheduling information for the one or more first STAs based on the first control information and second control information, to parse a data field of the first data packet. For example, when the first indication of the first control information is set to the fourth value, it indicates that the AP sends, on the channel 3 and the channel 4, the first data packet that is for the first STAs and that includes the second control information. In addition, the second control information may include resource scheduling information of a first part of the one or more first STAs, and the second control information is carried on the channel 4. When the first control information further includes resource scheduling information for a second part of the one or more first STAs, after receiving the first control information, the first STAs may obtain the resource scheduling information for the first part of the first STAs from the first control information, and obtain the resource scheduling information for the second part of the first STAs from the second control information, to parse the data field of the first data packet.

In this embodiment, when the AP performs multi-channel downlink hybrid transmission, especially when a preamble is punctured, a signal field that complies with the first standard is added to the first control information, so that the first STAs can obtain, from the first control information, signaling information for parsing the first data packet, so that the first STAs read signaling information according to a receiving procedure in a non-hybrid transmission case, and obtain the resource scheduling information to parse the data field of the first data packet. This reduces complexity of obtaining the resource scheduling information by the first STAs.

Figure 6:
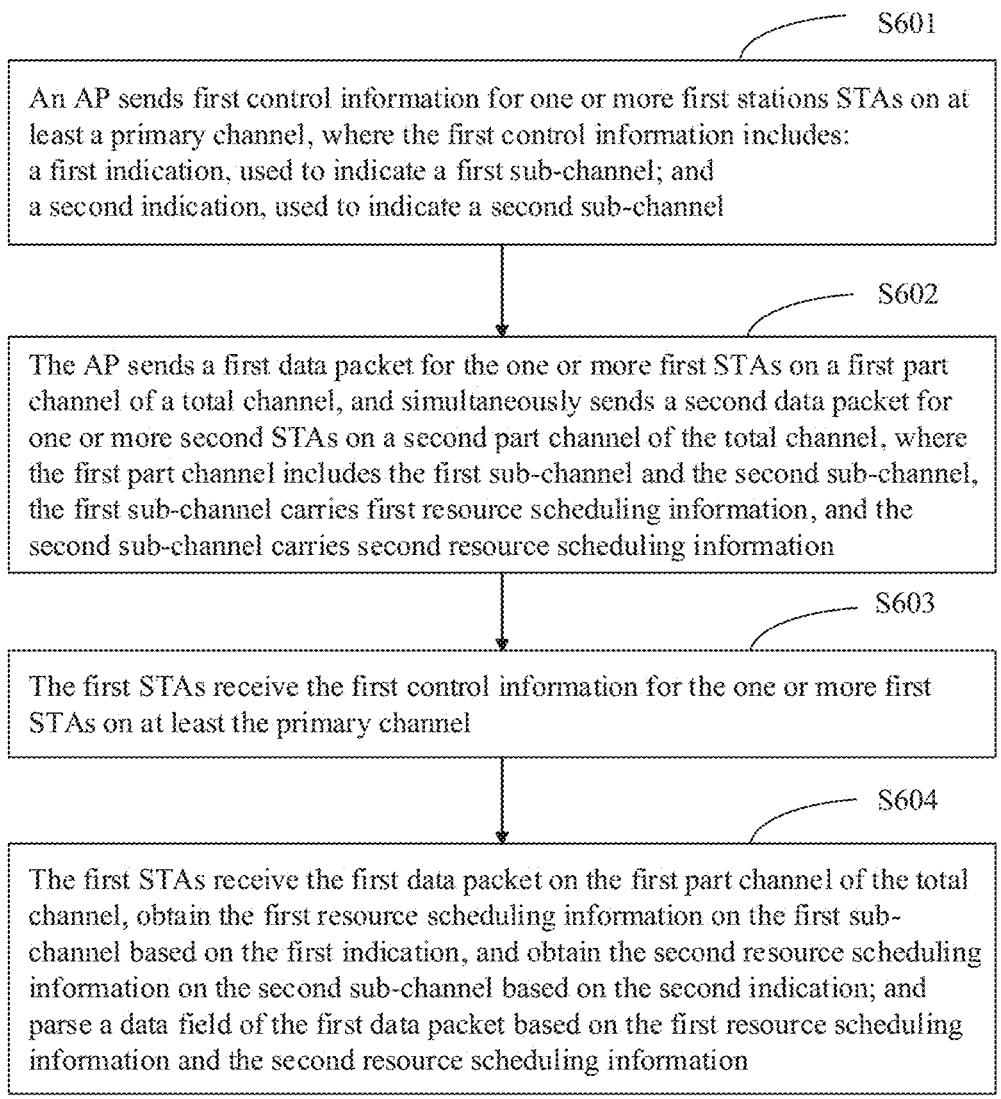
FIG. 6 is a schematic flowchart of another data transmission method according to an embodiment of this application.

Another embodiment of this application provides another data transmission method. The method includes the following steps as depicted in FIG. 6.

S601: An AP sends first control information for one or more first STAs on at least a primary channel, where
the first control information includes:
a first indication, used to indicate a first sub-channel; and
a second indication, used to indicate a second sub-channel.

It may be understood that the first indication may be a channel number or a channel index of the first sub-channel. For example, when a value of the first indication is 11, an indicated first sub-channel may be the channel 4 in FIG. 2. When a value of the first indication is 10, an indicated first sub-channel may be the channel 3 in FIG. 2.

Similarly, the second indication may also be a channel number or a channel index of the second sub-channel.

S602: The AP sends a first data packet for the one or more first STAs on a first part channel of a total channel, and simultaneously sends a second data packet for one or more second STAs on a second part channel of the total channel.

The first part channel does not overlap with the second part channel. The first part channel includes the first sub-channel and the second sub-channel, and the second part channel includes the primary channel. The first data packet includes first resource scheduling information and second resource scheduling information. The first sub-channel carries the first resource scheduling information, and the second sub-channel carries the second resource scheduling information.

The first resource scheduling information and the second resource scheduling information include resource scheduling information for the one or more first STAs.

The first resource scheduling information and the second resource scheduling information are used to instruct the one or more first STAs to parse the first data packet.

A capability set of the first STAs is different from that of the second STAs.

S603: The first STAs receive the first control information for the one or more first STAs on at least the primary channel.

S604: The first STAs receive the first data packet on the first part channel of the total channel, obtain the first resource scheduling information on the first sub-channel based on the first indication, and obtain the second resource scheduling information on the second sub-channel based on the second indication; and parse a data field of the first data packet based on the first resource scheduling information and the second resource scheduling information.

Specifically, the first resource scheduling information includes resource scheduling information for a first part of the one or more first STAs. The second resource scheduling information may include resource scheduling information for a second part of the one or more first STAs. An intersection set between the first part of the first STAs and the second part of the first STAs may be empty, or may not be empty. A union set of the first part of the first STAs and the second part of the first STAs is the one or more first STAs.

It may be understood that, when successfully reading one piece of first resource scheduling information and one piece of second resource scheduling information, the first STA may obtain complete resource scheduling information for parsing the data field of the first data packet.

Figure 7:
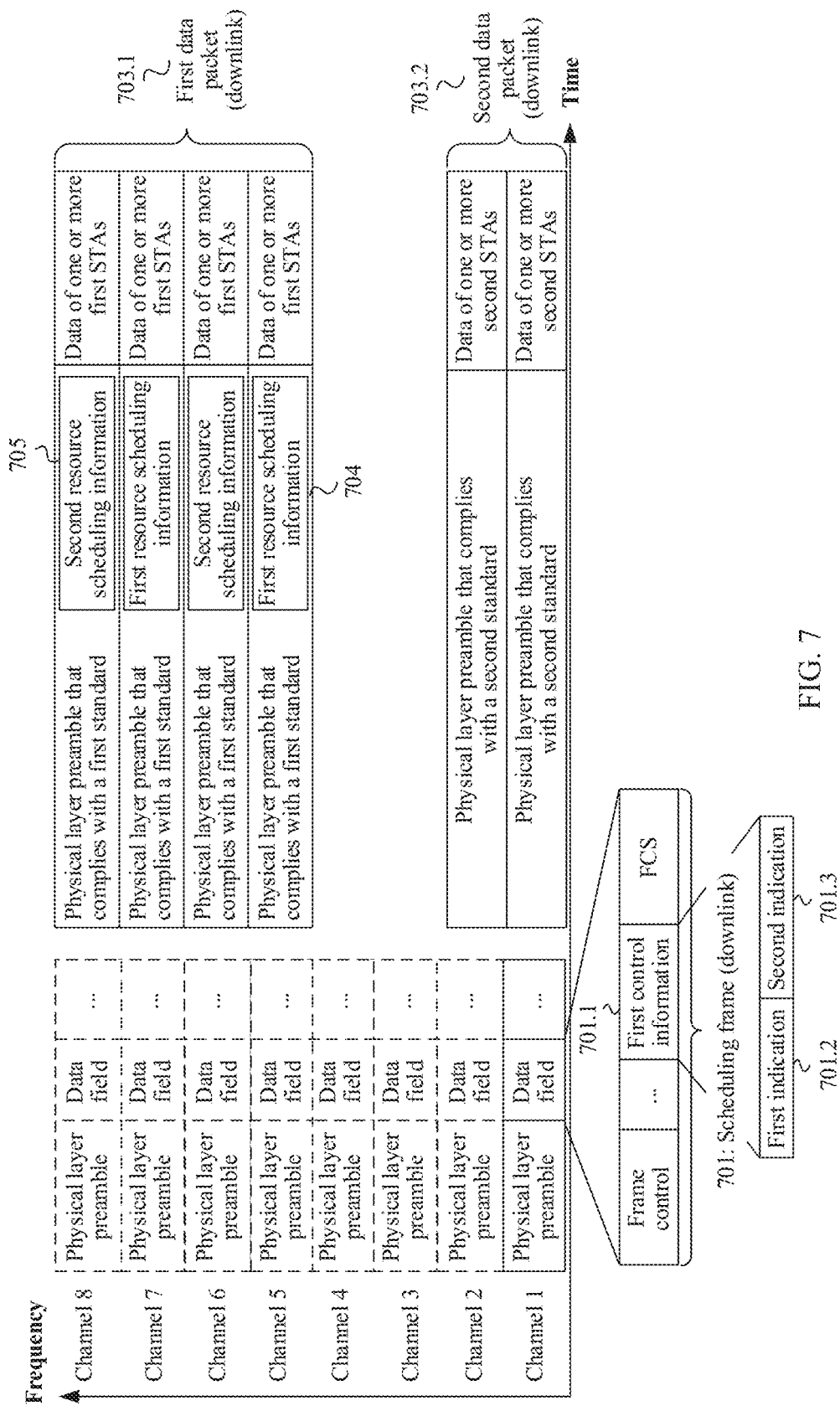
FIG. 7 is a schematic diagram of a time sequence of another data transmission method according to an embodiment of this application.

For example, as shown in FIG. 7, similarly, first control information 701.1 may be sent by using the foregoing method for sending the first control information 401.1. Details are not described herein again. The first control information 701.1 includes a first indication 701.2 and a second indication 701.3. The AP sends a first data packet 703.1 for the one or more first STAs on a first part channel (including channels 5, 6, 7, and 8) of the total channel. Herein, for example, the one or more first STAs are an STA 1, an STA 2, an STA 3, and an STA 4. In other words, a bandwidth of all secondary channels occupied by the first data packet 703.1 is 80 MHz. Physical layer preambles that are carried on the channel 5 and the channel 7 and that comply with a first standard include first resource scheduling information 704, and physical layer preambles that are carried on the channel 6 and the channel 8 and that comply with the first standard include second resource scheduling information 705. The first resource scheduling information may include resource scheduling information for the STA 1 and the STA 2, and the second resource scheduling information may include resource scheduling information for the STA 3 and the STA 4. It may be understood that, when obtaining one piece of first resource scheduling information and one piece of second resource scheduling information, the first STAs may obtain all complete resource scheduling information. Therefore, the first indication 701.2 needs to indicate only one of the channel 5 or the channel 7, and the second indication 701.3 needs to indicate only one of the channel 6 or the channel 8. Further, the first STAs obtain the first resource scheduling information based on the first indication, and obtain the second resource scheduling information based on the second indication. In this case, the first STAs may parse a data field of the first data packet with reference to the first resource scheduling information and the second resource scheduling information.

In an example, a total of 2 bits may be used to indicate the first sub-channel that carries the first resource scheduling information and the second sub-channel that carries the second resource scheduling information, and indicate that a bandwidth of the total channel is 80 MHz. For the first indication, 1 bit may be used to indicate the first sub-channel on which the first resource scheduling information is located. For the second indication, another 1 bit may be used to indicate the second sub-channel on which the second resource scheduling information is located. For example, as shown in Table 1 and Table 2, based on the channel numbers shown in FIG. 2, when a value of the first indication is 1, it indicates that the first sub-channel is the channel 3, and the channel 3 carries the first resource scheduling information. When a value of the second indication is 1, it indicates that the second sub-channel is the channel 4, and the channel 4 carries the second resource scheduling information. It should be noted that, when the value of the first indication is 0, it indicates that the channel 1 carries the first resource scheduling information. It may be understood that data of the first STAs is transmitted on the primary channel. Therefore, hybrid transmission is not performed.

TABLE 1

| Value of the first indication | Channel on which the first resource scheduling information is located |
|---|---|
| 1 | Channel 3 |
| 0 | Channel 1 |

TABLE 2

| Value of the second indication | Channel on which the second resource scheduling information is located |
|---|---|
| 1 | Channel 4 |
| 0 | Channel 2 |

In another example, a total of 4 bits may be used to indicate the first sub-channel that carries the first resource scheduling information and the second sub-channel that carries the second resource scheduling information, and indicate that a bandwidth of the total channel is 160 MHz. For the first indication, 2 bits may be used to indicate the first sub-channel that carries the first resource scheduling information. For the second indication, another 2 bits may be used to indicate the second sub-channel that carries the second resource scheduling information. For example, this is shown in Table 3 and Table 4. It may be understood that, when numbers of channels for transmitting the first data packet of the first STAs are 3, 4, 5, 6, 7, and 8, the first resource scheduling information may be repeatedly carried on the channels 3, 5, and 7, and the second resource scheduling information may be repeatedly carried on the channels 4, 6, and 8. In this case, a value of the first indication may be any one of 11, 10, or 00, and a value of the second indication may be any one of 11, 10, or 00.

TABLE 3

| Value of the first indication | Channel that carries the first resource scheduling information |
|---|---|
| 11 | Channel 7 |
| 10 | Channel 5 |
| 01 | Channel 3 |
| 00 | Channel 1 |

TABLE 4

| Value of the second indication | Channel that carries the second resource scheduling information |
|---|---|
| 11 | Channel 8 |
| 10 | Channel 6 |
| 01 | Channel 4 |
| 00 | Channel 2 |

In still another example, a total of 8 bits may be used to indicate the first sub-channel that carries the first resource scheduling information and the second sub-channel that carries the second resource scheduling information, and indicate that a bandwidth of the total channel is 320 MHz. For the first indication, 4 bits may be used to indicate the first sub-channel that carries the first resource scheduling information. For the second indication, another 4 bits may be used to indicate the second sub-channel that carries the second resource scheduling information.

In yet another example, in the 802.11 standard, 80 MHz is used as a channel segment. When the first data packet of the first STAs occupies a plurality of channel segments, the first resource scheduling information is repeatedly carried on some 20 MHz channels, and the second resource scheduling information is repeatedly carried on other some 20 MHz channels. Therefore, the first STAs may need to read only the first resource scheduling information and the second resource scheduling information on some segments. Fewer bits may further be used to indicate secondary channels on which the resource scheduling information that needs to be read are located. For example, when the bandwidth of the total channel is 320 MHz, the channel is divided into four segments. The first STAs need to read one piece of first resource scheduling information and one piece of second resource scheduling information only in the first two segments, to obtain complete resource indication information. In the first two segments, there are only four pieces of repeated first resource scheduling information and four pieces of repeated second resource scheduling information. Therefore, only 4 bits are required in total to indicate secondary channels on which the first resource scheduling information and the second resource scheduling information are located, to reduce overheads.

Optionally, structures of the first resource scheduling information and the second resource scheduling information may be similar to that of a content channel CC (Content Channel, CC for short) in 802.11ax. The first resource scheduling information may be a first content channel, and the second resource scheduling information may be a second content channel. The content channel (CC for short) may include a common block field and a user-specific field The common block field is mainly used to indicate resource unit allocation, and includes a resource unit allocation field. The resource unit allocation field may be used to indicate resource unit allocation in frequency domain and a quantity of scheduled STAs in each resource unit. A station-by-station field in the user-specific field may include information such as an identifier (which is usually an association identifier AID of an STA) of a station that is scheduled on a corresponding resource unit, a number of space-time streams of a single user, a transmit beamforming indication, a modulation and coding scheme, and dual-carrier modulation (DCM).

In a content channel CC, a quantity of bits of the resource unit allocation field is N times 8. When N=1, the resource unit allocation field is used to indicate resource allocation information of a 20 MHz PPDU and a 40 MHz PPDU. When N=2, the resource unit allocation field is used to indicate resource allocation information of an 80 MHz PPDU. When N=3, the resource unit allocation field is used to indicate resource allocation information of a 160 MHz PPDU.

The 20 MHz physical layer protocol data unit PPDU includes one content channel CC. A resource unit allocation field of the content channel CC is 8 bits, and indicates resource allocation information of a 20 MHz channel. The 40 MHz PPDU includes two different content channels CC, which are denoted as a first content channel CC 1 and a second content channel CC 2. A resource unit allocation field of the CC 1 is 8 bits, and the 8 bits are used to indicate resource allocation information of the channel 1. A resource unit allocation field of the CC 2 is 8 bits, and the 8 bits are used to indicate resource allocation information of the channel 2. The 80 MHz PPDU includes two repeated CCs 1 and two repeated CCs 2. The CCs 1 are repeated on the channel 1 and the channel 3, and resource unit allocation fields of the CCs 1 are 16 bits. 8 bits are used to indicate resource allocation information of the channel 1, and the other 8 bits are used to indicate resource allocation information of the channel 3. The CCs 2 are repeated on the channel 2 and the channel 4, and resource unit allocation fields of the CCs 2 are 16 bits. 8 bits are used to indicate resource allocation information of the channel 2, and the other 8 bits are used to indicate resource allocation information of the channel 4. The 160 MHz PPDU includes four repeated CCs 1 and four repeated CCs 2. The resource allocation information of the 160 MHz PPDU is similar to that of the 80 MHz PPDU.

It may be understood that, when a physical layer protocol data unit includes more than two categories of content channels, likewise, the physical layer protocol data unit may separately indicate sub-channels that carry the different categories of content channels. For example, if the bandwidth of the total channel is 320 MHz, there are four categories of CCs: four repeated CCs 1, four repeated CCs 2, four repeated CCs 3, and four repeated CCs 4. For example, the CCs 1 include resource allocation information of channels 1, 3, 5, and 7. The CCs 2 include resource allocation information of channels 2, 4, 6, and 8. The CCs 3 include resource allocation information of channels 9, 11, 13, and 15. The CCs 4 include resource allocation information of channels 10, 12, 14, and 16. Therefore, a total of 8 bits may be used to indicate secondary channels on which the four categories of CCs are located. For the first indication, the first 2 bits may be used to indicate first sub-channels that carry the CCs 1. For the second indication, the second 2 bits may be used to indicate second sub-channels that carry the CCs 2. In addition, a third indication is added to the first control information, the third 2 bits are used to indicate third sub-channels that carry the CCs 3, a fourth indication is added, and the fourth 2 bits are used to indicate fourth sub-channels that carry the CCs 4.

It may be understood that a value of the first indication, the second indication, the third indication, or the fourth indication and a secondary channel indicated by the value may change, and are not limited to the examples listed in this embodiment.

After receiving the first control information, the first STAs may obtain, based on the first indication and the second indication, the first resource scheduling information on the first sub-channel indicated by the first indication, and the second resource scheduling information on the second sub-channel indicated by the second indication, and parse the data field of the first data packet with reference to the first resource scheduling information and the second resource scheduling information. Compared with the prior art, in this embodiment, only sub-channels that are just sufficient for obtaining complete resource scheduling information are indicated, and fewer bits are used for indication, so that overheads are reduced, and the first STAs do not need to read repeated resource scheduling information on each secondary channel. Therefore, efficiency of reading the resource scheduling information by the first STAs is improved.

An embodiment of this application provides still another data transmission method. The method includes the following steps.

An AP sends first control information for one or more first STAs on at least a primary channel.

The first control information includes an identifier used to indicate a secondary channel, and the secondary channel is used to carry data of the first STAs.

The AP sends, on the secondary channel, a first data packet of the one or more first STAs that comply with a first standard, and sends, on at least a primary channel, a second data packet of one or more second STAs that comply with a second standard.

A receiving point receives the first control information for the one or more first STAs on at least the primary channel.

The receiving point receives the first data packet on the secondary channel.

Specifically, the AP may send data for the one or more first STAs on a fixed secondary channel. For example, when a value of the identifier used to indicate a secondary channel is 00, it may indicate that the AP transmits the data of the first STAs on a 20 MHz secondary channel (for example, the channel 2 in FIG. 2), and a bandwidth of the total channel is 40 MHz. When the value of the identifier used to indicate a secondary channel is 01, it may indicate that the AP transmits the data of the first STAs on a 40 MHz secondary channel (for example, the channel 3 and the channel 4 in FIG. 2), and a bandwidth of the total channel is 80 MHz. When the value of the identifier used to indicate a secondary channel is 10, it may indicate that the AP transmits the data of the first STAs on an 80 MHz secondary channel (for example, the channels 5, 6, 7, and 8 in FIG. 2), and a bandwidth of the total channel is 160 MHz. When the value of the identifier used to indicate a secondary channel is 11, it may indicate that the AP transmits the data of the first STAs on a 160 MHz secondary channel. It may be understood that, a specific secondary channel corresponding to a value of the identifier used to indicate a secondary channel is permutable.

After receiving the first control information, the first STAs determine, based on the first control information, a secondary channel that carries the first data packet of the first STAs, and receive the first data packet of the first STAs on the secondary channel.

Figure 8:
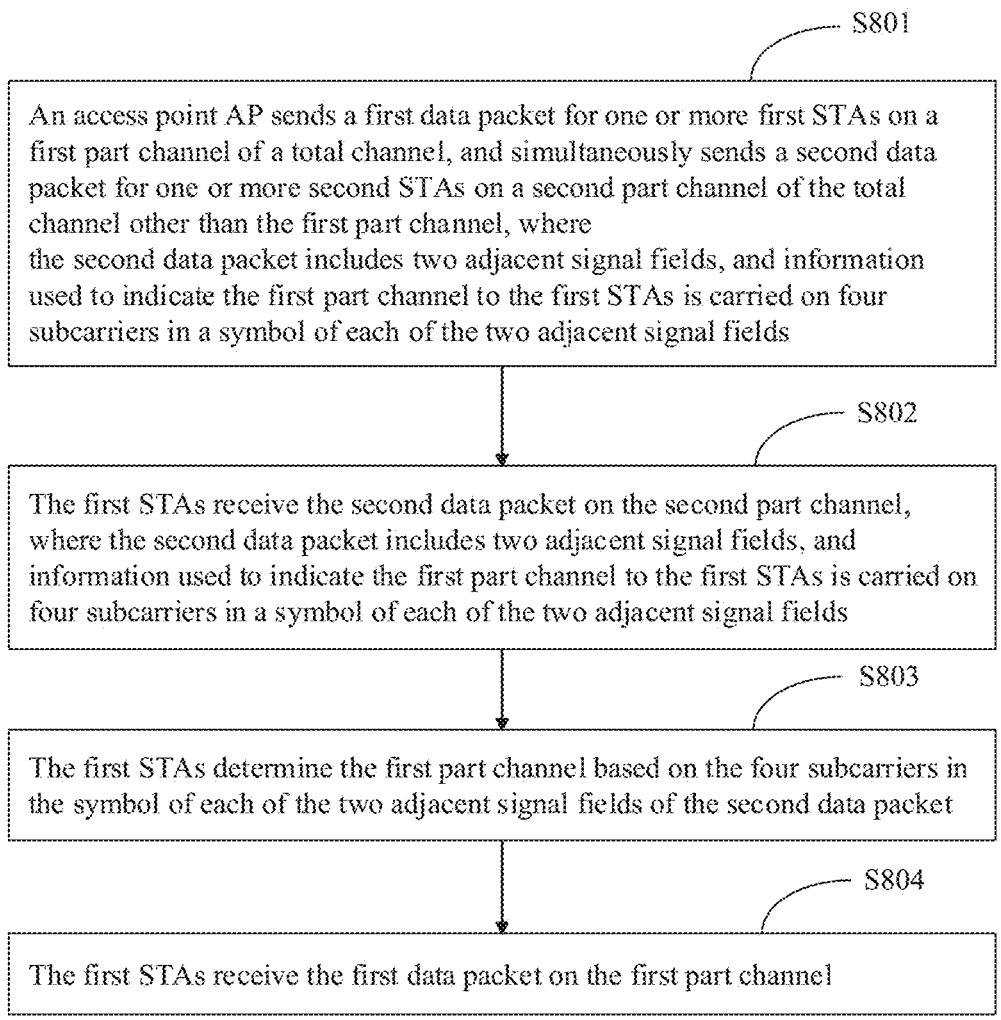
FIG. 8 is a schematic flowchart of still another data transmission method according to an embodiment of this application.

FIG. 8 is a schematic flowchart of still another data transmission method according to an embodiment of this application.

S801: An access point AP sends a first data packet for one or more first STAs on a first part channel of a total channel, and simultaneously sends a second data packet for one or more second STAs on a second part channel of the total channel other than the first part channel, where the second data packet includes two adjacent signal fields, and information used to indicate the first part channel to the first STAs is carried on four subcarriers in a symbol of each of the two adjacent signal fields.

The information used to indicate the first part channel is specifically: A first value set is carried on four subcarriers in a symbol of the first signal field of the two adjacent signal fields, and a second value set is carried on four subcarriers in a symbol of the second signal field of the two adjacent signal fields, so that the first STAs determine the first part channel based on the first value set and the second value set.

Subcarrier indexes of the four subcarriers are [−28, −27, 27, 28].

A maximum of one of the first value set and the second value set is [−1, −1, −1, 1], and the first value set is different from the second value set.

The second part channel includes a primary channel, and the first part channel includes one or more secondary channels.

A capability set of the first STAs is different from that of the second STAs.

S802: The first STAs receive the second data packet on the second part channel, where the second data packet includes two adjacent signal fields, and information used to indicate the first part channel to the first STAs is carried on four subcarriers in a symbol of each of the two adjacent signal fields.

S803: The first STAs determine the first part channel based on the information carried on the four subcarriers in the symbol of each of the two adjacent signal fields of the second data packet.

S804: The first STAs receive the first data packet on the first part channel.

Specifically, that the first STAs determine the first part channel includes: The first STAs perform channel estimation on the four subcarriers in the symbol of the first signal field, demodulate the four subcarriers in the symbol of the second signal field based on the channel estimation, to obtain a third value set, and determine whether the third value set is equal to the second value set; or the first STAs calculate a difference result between the first value set transmitted on the four subcarriers in the symbol of the first signal field and the second value set transmitted on the four subcarriers in the symbol of the second signal field, and determine whether the difference result is not 0 or is greater than or is greater than or equal to a preset threshold; and if the third value set is equal to the second value set or the difference result is greater than 0 or greater than (or greater than or equal to) the preset threshold, the first STAs determine a bandwidth of the second part channel of the second data packet, and determine the first part channel.

The second data packet includes a physical layer preamble that complies with a second standard, and the physical layer preamble that complies with the second standard includes a legacy preamble (L-Preamble for short). The legacy preamble includes a legacy short training field (L-STF), a legacy long training field (L-LTF), and a legacy signal field (L-SIG). In addition, the second data packet further includes another signal field. When the second standard is 802.11ac, the physical layer preamble that complies with the second standard further includes a very high throughput signal field A1 (VHT-SIG A1 for short), a very high throughput signal field A2 (VHT-SIG A2 for short), a very high short training sequence, and a very high long training sequence. When the second standard is 802.11n, the physical layer preamble that complies with the second standard further includes a high throughput signal field 1 (HT-SIG 1 for short), a high throughput signal field 2 (HT-SIG 2 for short), a high throughput short training sequence, and a high throughput long training sequence.

In an example, the information may be carried on four subcarriers in a symbol of each of the L-SIG and a signal field adjacent to the L-SIG. For example, the information may be carried on four subcarriers in a symbol of each of the L-SIG and the RL-SIG, or the information may be carried on four subcarriers in a symbol of each of the L-SIG and the VHT-SIG A1, or the information may be carried on four subcarriers in a symbol of each of the L-SIG and the HT-SIG 1. This is not specifically limited in this embodiment.

Figure 9:
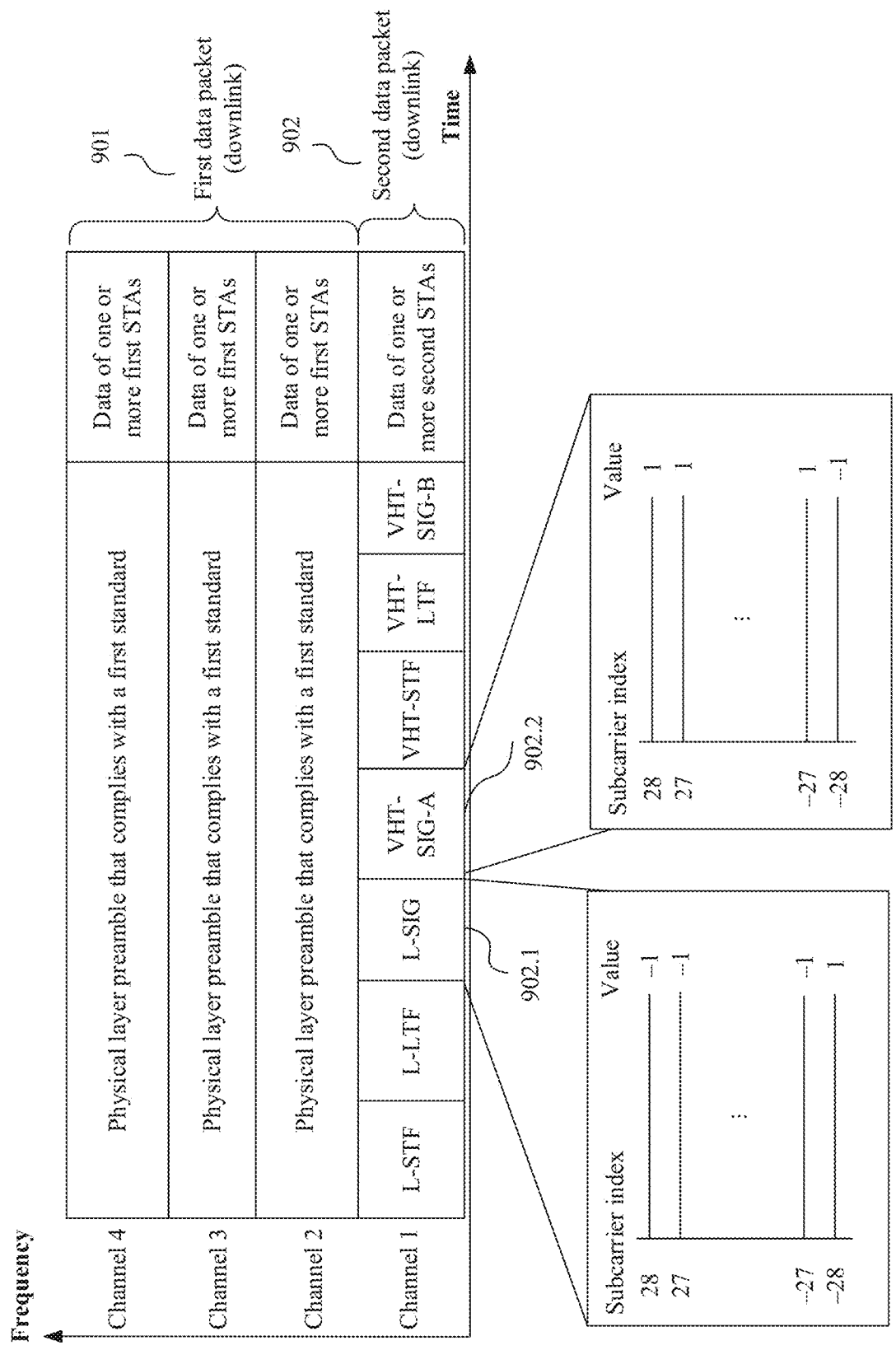
FIG. 9 is a schematic diagram of a time sequence of still another data transmission method according to an embodiment of this application.

For example, as shown in FIG. 9, an example in which the AP performs multi-channel hybrid transmission to the second STAs that comply with the 802.11ac standard protocol and the first STAs is used for description. The AP sends, on the second part channel, a second data packet 902 for the one or more second STAs that comply with the 802.11ac standard protocol, and sends, on the first part channel, a first data packet 901 for the one or more first STAs that comply with a first standard. In the second data packet, values transmitted on four subcarriers in a symbol of an L-SIG 902.1 are different from values transmitted on four subcarriers in a symbol of a VHT-SIG A1 902.2. In addition, a maximum of one set of values in the two sets of values are [−1, −1, −1, 1], to indicate, to the first STAs, that data of the one or more first STAs is carried in the second data packet. The indication information is hidden from the second STAs. To be specific, the second STAs can normally receive the L-SIG and a signal field adjacent to the L-SIG, but cannot find a change of the L-SIG and the signal field adjacent to the L-SIG, and can normally parse data of the second STAs.

It should be noted that, for a data packet that complies with 802.11a, 802.11, and the like that are earlier than the 802.11ax standard protocol, no data is transmitted on four subcarriers whose subcarrier indexes are [−28, −27, 27, 28] and that are in a symbol of each of the L-SIG field and a subsequent field (for example, the VHT-SIG A1 or the HT-SIG1) adjacent to the L-SIG. For a data packet that complies with the 802.11ax standard protocol, values transmitted on four subcarriers whose subcarrier indexes are [−28, −27, 27, 28] and that are in a symbol of each of the L-SIG field and a subsequent field adjacent to the L-SIG are [−1, −1, −1, 1]. Therefore, [−1, −1, −1, 1] may not be transmitted on the four subcarriers in at least one of the symbols of the L-SIG field and the subsequent field adjacent to the L-SIG. In this case, the first STAs may quickly identify that the data packet is neither a data packet that complies with the 802.11ax standard protocol, nor a data packet that complies with 802.11a, 802.11, and the like that are earlier than the 802.11ax standard protocol.

In an example, the information may be carried only on four subcarriers in a symbol in each of the L-SIG and a subsequent field adjacent to the L-SIG that are on the primary channel (the second part channel), to indicate, to the first STAs, that the primary channel does not carry the data packet of the first STAs, so that the first STAs receive the first data packet on the first part channel other than the primary channel. For example, a data packet that complies with the 802.11ac standard is transmitted on the primary channel in FIG. 9. In this case, the information may be carried on subcarriers whose subcarrier indexes are [−28, −27, 27, 28] and that are in a symbol of each of the L-SIG 902.1 and the VHT-SIG A1 902.2. For example, a first value set [−1, −1, −1, 1] is transmitted on subcarriers whose subcarrier indexes are [−28, −27, 27, 28] and that are in the symbol of the L-SIG 902.1, and a second value set [1, 1, 1, −1] is transmitted on subcarriers whose subcarrier indexes are [−28, −27, 27, 28] and that are in the symbol of the VHT-SIG A1 902.2. When reading the L-SIG 902.1 and the VHT-SIG A1 902.2 fields on the primary channel in a hybrid data packet, after performing channel estimation on the subcarriers [−28, −27, 27, 28] in the L-SIG 902.1, the first STAs demodulate the subcarriers [−28, −27, 27, 28] in the VHT-SIG A1 902.2 to obtain a third value set, and determine, through comparison, whether the third value set is the second value set [1, 1, 1, −1], to determine whether hybrid data transmission is performed. Alternatively, the first STAs may calculate a difference result by using the information carried on the subcarriers [−28, −27, 27, 28] in each of the L-SIG 902.1 and the VHT-SIG A1 902.2. If the difference result between the values transmitted on the subcarriers [−28, −27, 27, 28] in each of the L-SIG and the VHT-SIG A1 is 0 or less than (or less than or equal to) a preset threshold, or the third value set is not equal to the second value set, the first STAs determine that hybrid transmission is not performed; or if the difference result is not 0 or is greater than or equal to (or greater than) a preset threshold, the first STAs determine that the hybrid data packet is being sent, and the primary channel does not carry the data packet of the first STAs. Therefore, the first STAs receive the data packet of the first STAs on a secondary channel (the first part channel) other than the primary channel (the second part channel).

In another example, the information may alternatively be carried on four subcarriers in each of the L-SIG and a subsequent field adjacent to the L-SIG that are on the primary channel and at least one secondary channel adjacent to the primary channel (the second part channel), to indicate, to the first STAs, that a hybrid data packet is being sent, and indicate that the data packet of the first STAs is not carried on the primary channel and the at least one secondary channel adjacent to the primary channel (the second part channel). Similarly, the information may be carried on subcarriers whose subcarrier indexes are [−28, −27, 27, 28] and that are in each of the L-SIG and a signal field adjacent to the L-SIG. A specific method is similar to the foregoing descriptions, and details are not described herein again. After receiving the hybrid data packet, the first STAs determine the information carried on the four subcarriers in each of the L-SIG and the subsequent field adjacent to the L-SIG that are on the primary channel and the at least one secondary channel adjacent to the primary channel (the second part channel), to learn a bandwidth for transmitting the data packet of the second STAs, and learn that the second part channel does not carry data of the one or more first STAs. Therefore, the first STAs receive the first data packet on the first part channel other than the second part channel.

In this embodiment, the information is carried on the four subcarriers in the symbol of each of the two adjacent signal fields in the second data packet, to indicate, to the first STAs, that the hybrid data packet is being sent, and control information does not need to be sent in advance, to reduce overheads, and improve hybrid transmission efficiency.

Figure 10:
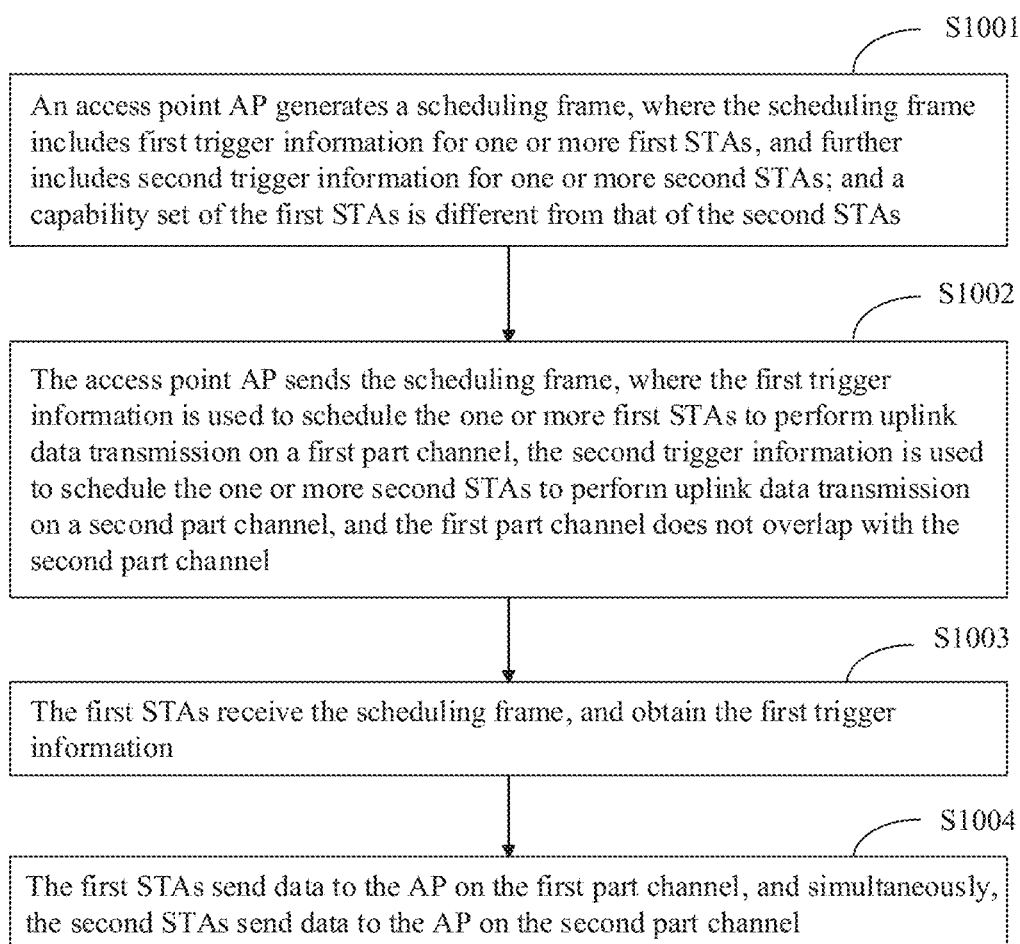
FIG. 10 is a schematic flowchart of yet another data transmission method according to an embodiment of this application.

FIG. 10 is a schematic flowchart of yet another data transmission method according to an embodiment of this application. The following further describes the solution of this embodiment with reference to FIG. 10 and FIG. 11.

S1001: An access point AP generates a scheduling frame, where the scheduling frame includes first trigger information for one or more first STAs and second trigger information for one or more second STAs, the first trigger information is used to schedule the one or more first STAs to perform uplink data transmission on a first part channel, the second trigger information is used to schedule the one or more second STAs to perform uplink data transmission on a second part channel, and the first part channel does not overlap with the second part channel.

S1002: The access point AP sends the scheduling frame.

Specifically, the scheduling frame is a MAC frame. The scheduling frame may be sent by the AP on at least a primary channel.

S1003: The first STAs that comply with a first standard receive the scheduling frame, and obtain the first trigger information.

S1004: The first STAs send data to the AP on the first part channel, and simultaneously, the second STAs send data to the AP on the second part channel.

It may be understood that the first part channel does not overlap with the second part channel, and the first part channel may include the primary channel, or the second part channel may include the primary channel.

After the first STAs and the second STAs receive the scheduling frame sent by the AP, the first STAs obtain the first trigger information of the first STAs, and the second STAs obtain the second trigger information of the second STAs. The first STAs perform, by using a PPDU, transmission on one or more 20 MHz channels indicated by the first trigger information, and the second STAs perform, by using an HE TB PPDU (High Efficiency Trigger-based PPDU, HE TB PPDU for short), on other one or more 20 MHz channels indicated by the second trigger information.

Further, after receiving uplink hybrid data packet sent by the first STAs and the second STAs, the AP may further feedback a multi-user block acknowledgement (M-BA for short) to each of at least one first STA and at least one second STA.

Figure 11:
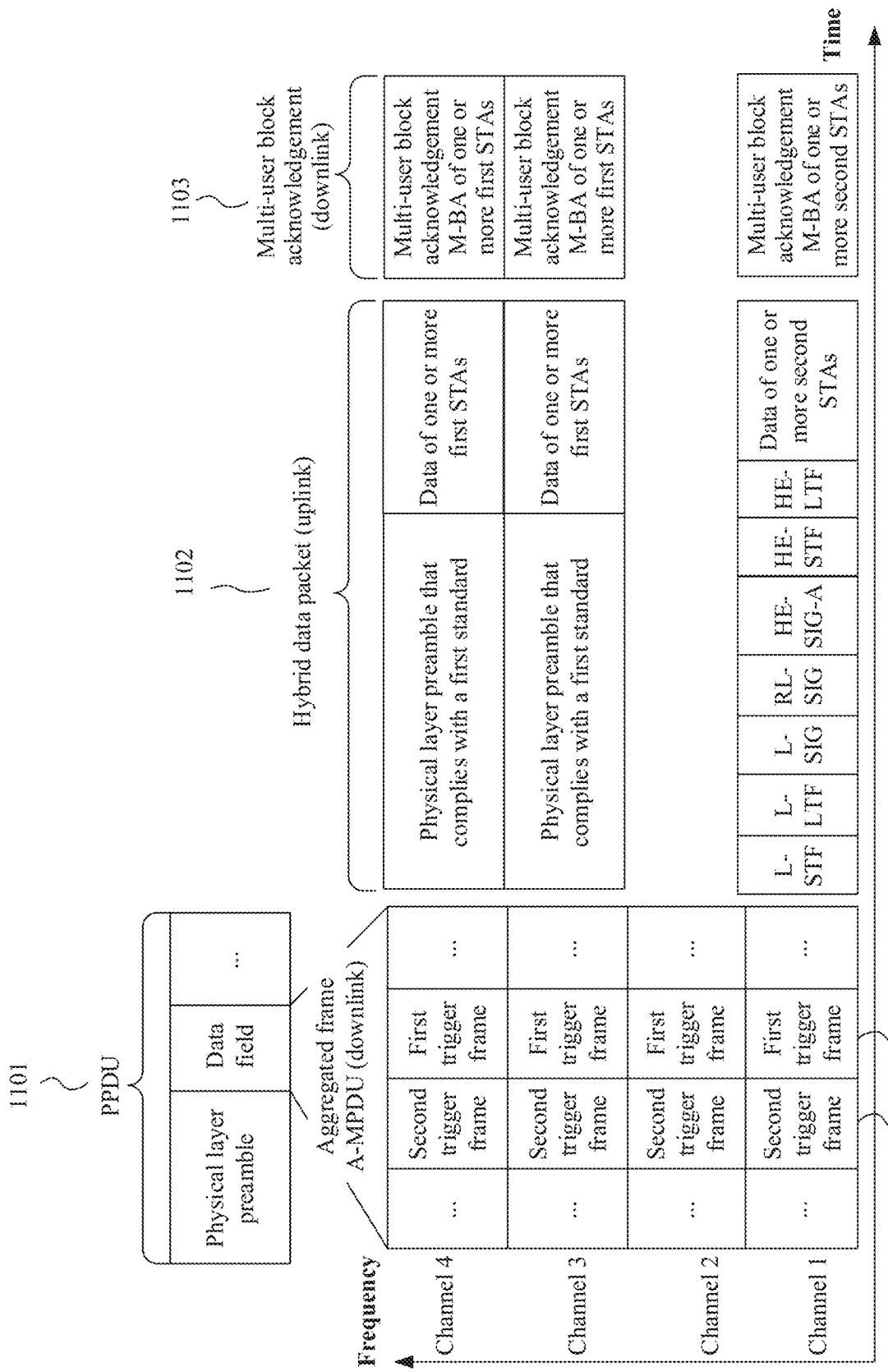
FIG. 11 is a schematic diagram of a time sequence of yet another data transmission method according to an embodiment of this application.

In an example, the scheduling frame may be an aggregated frame, namely, an aggregated media access control protocol data unit (A-MPDU for short). For example, as shown in FIG. 11, a second trigger frame 1101.2 of the second STAs, namely, a trigger frame that complies with the 802.11ax standard protocol, is carried in a subframe in the aggregated frame A-MPDU. The second trigger frame includes the second trigger information. A first trigger frame 1101.1 of the first STAs is carried in another subframe in the aggregated frame A-MPDU. The first trigger frame includes the first trigger information. The first trigger frame 1101.1 is a trigger frame that complies with the first standard. It should be noted that a physical layer preamble (PHY Preamble) of the aggregated frame complies with 802.11ax or a standard protocol earlier than 802.11ax, so that a conventional station can normally receive the aggregated frame and parse a trigger frame of the conventional station. The second trigger frame 1101.2 is used to schedule one or more stations complying with the 802.11ax protocol to perform uplink transmission by using an HE TB PPDU (High Efficiency Trigger-based PPDU), and the first trigger frame 1101.1 is used to schedule the one or more first STAs to perform uplink transmission by using a multi-user PPDU.

It should be noted that, on a 20 MHz channel, all scheduled stations comply with a same standard protocol. Because the standard protocol earlier than 802.11ax does not support the trigger frame, the second STAs in this embodiment are particularly STAs that comply with the 802.11ax standard protocol, and are also referred to as HE STAs (High Efficiency Station).

Figure 12:
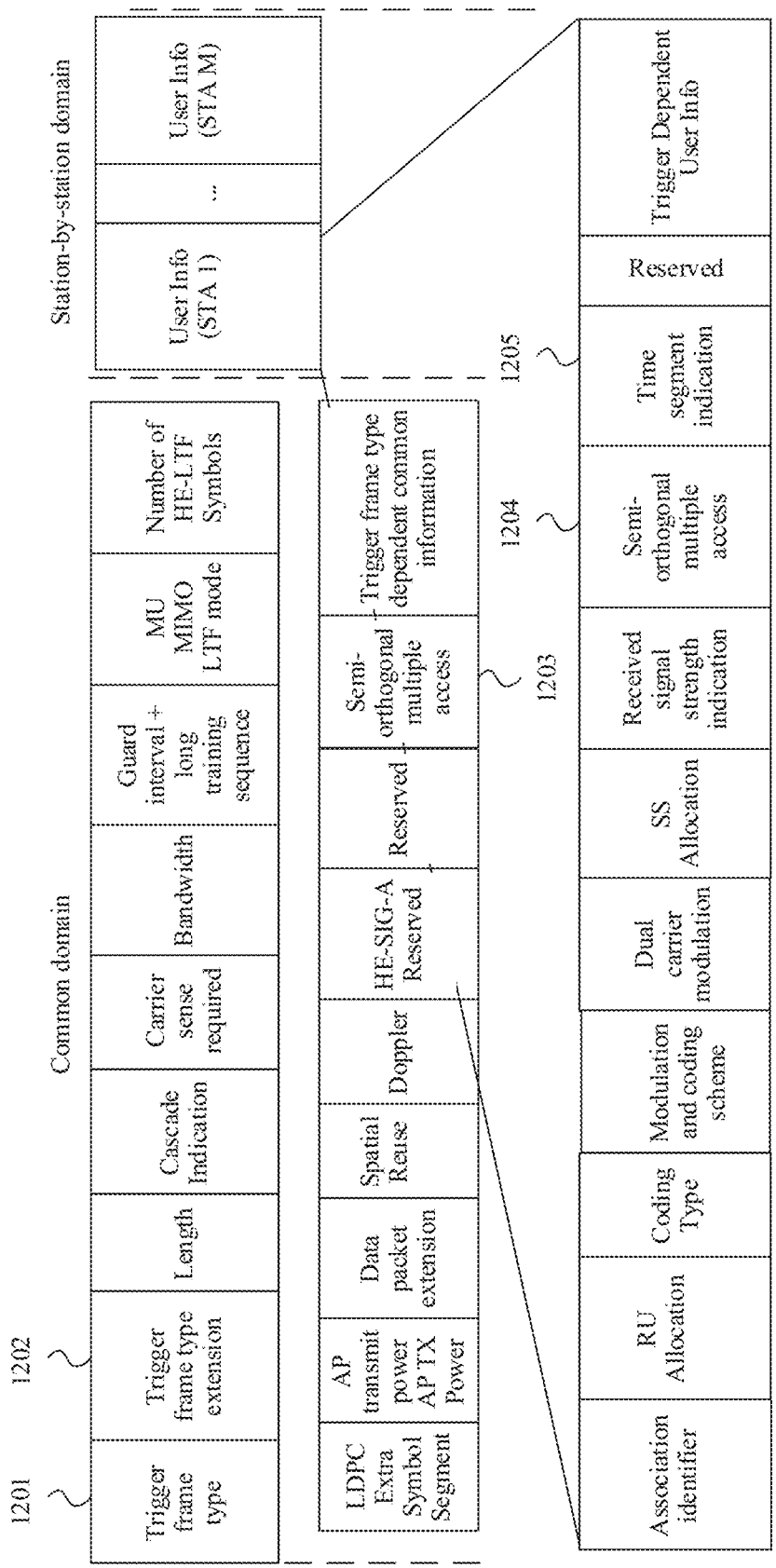
FIG. 12 is a schematic diagram of a frame structure of a trigger frame that complies with a first standard according to an embodiment of this application.

In another example, a frame structure of the first trigger frame 1101.1 that complies with the first standard may be shown in FIG. 12. The first trigger frame 1101.1 includes a common field and a station-by-station domain, and the station-by-station domain may include one or more user information fields of the one or more first STAs. The common field may include a field that has a function the same as or similar to that of a field in 802.11ax, and may further include a trigger frame type extension field 1202 (trigger type extension), where the trigger frame type extension field 1202 is used to indicate a type of a trigger frame that complies with a next-generation or next-next-generation standard; and may further include semi-orthogonal multiple access (SOMA for short) 1203, used to indicate a multiple access mode that can be used by the first STAs. In addition, the user information field) of each first STA in the station-by-station domain may further include semi-orthogonal multiple access indication information 1204 and a time segment indication 1205. The time segment indication information is used to indicate a time segment in which the station is located.

It should be noted that the frame structure shown in FIG. 12 is merely an example for description. The first STAs may support full-duplex transmission, and support a higher transmission bandwidth, more spatial streams, and the like. Therefore, more bits may be required to carry the foregoing information. The first trigger frame of the first STAs may have a frame structure similar to that of the second trigger frame, or may have a frame structure different from that of the second trigger frame. This is not specifically limited in this solution.

In another optional manner, the scheduling frame may alternatively be a third trigger frame that complies with the 802.11ax standard protocol. The third trigger frame may be indicated in an escape manner by using a trigger frame that complies with the 802.11ax standard protocol, to simultaneously schedule the one or more second STAs that comply with 802.11ax and the one or more first STAs that comply with the first standard.

The third trigger frame includes a first user information field that carries the first trigger information and a second user information field that carries the second trigger information. The first user information field includes information used to prevent the second STAs from misreading.

Figure 13:
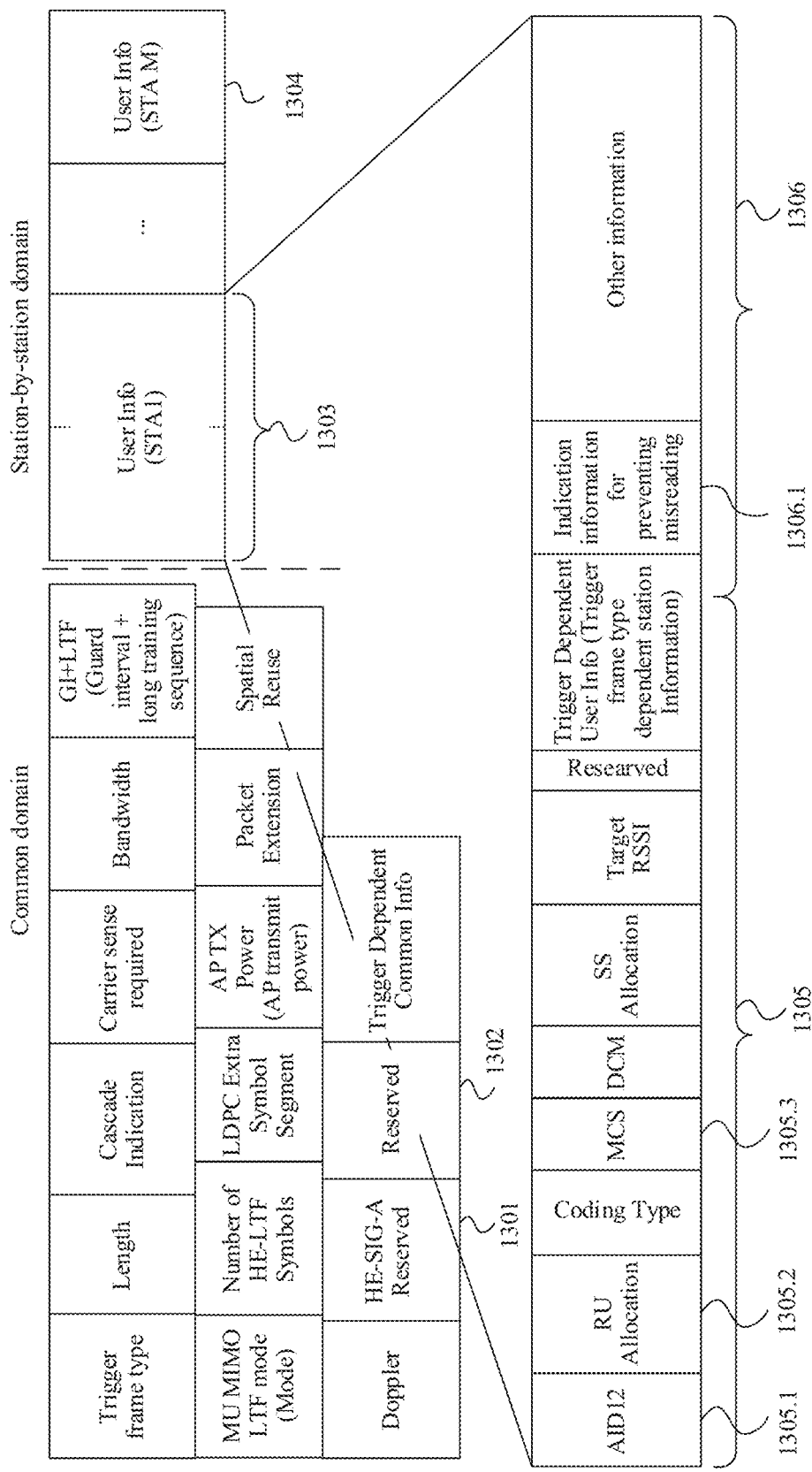
FIG. 13 is a schematic diagram of a frame structure of another trigger frame according to an embodiment of this application.

A possible frame structure of the third trigger frame is shown in FIG. 13. A reserved bit in a common field, for example, HE SIG-A Reserved 1301 or Reserved 1302, may be used to indicate, to the first STAs, that the third trigger frame is an extended trigger frame, used to simultaneously schedule one or more 802.11ax stations and the one or more first STAs. A station-by-station domain may include both one or more user information fields 1304 of the one or more 802.11ax stations and one or more user information fields 1303 of the one or more first STAs.

Optionally, the user information field 1303 of each first STA may include user information fields 1305 and 1306 of two 802.11ax stations, and a length of the user information field 1303 may be twice a length of the user information field of the 802.11ax station.

The user information field 1303 of the first STA may include information that has a function similar to that of the 802.11ax user information field, for example, an association identifier AID 1305.1, resource indication information 1305.2, and a modulation and coding scheme MCS 1305.3 that are of the first STA, and may further include other information such as an indication in which a quantity of streams is higher than a quantity of streams in 802.11ax, semi-orthogonal multiple access SOMA indication information, and time reuse (Time reuse) indication information.

Indication information that prevents the 802.11ax station from misreading is added to the second user information field 1306 in the two user information fields included in the user information field 1303 of the first STA. In an optional manner, a most significant bit of the association identifier AID in the second user information field 1306 may be set to 1. When the 802.11ax station reads the AID, a value of the AID is greater than 2047. Therefore, the 802.11ax station cannot misread the information field as an information field of the 802.11ax station. In another optional manner, a resource unit allocation field RU Allocation in the second user information field may be set to a reserved value or the modulation and coding scheme MCS may be set to a reserved value. When reading the reserved value, the 802.11ax station cannot understand a meaning of the reserved value. Therefore, the 802.11ax station cannot misread the information field as an information field of the 802.11ax station.

It may be understood that user information fields of a plurality of second STAs may alternatively be used to indicate the user information field of the first STA. In this embodiment, that two user information fields are selected and combined into one user information field of the first STA is merely an example, and does not constitute a limitation.

In this embodiment, the first trigger information for the first STAs and the second trigger information for the second STAs are added to the scheduling frame, so that the one or more first STAs and the one or more second STAs may be simultaneously scheduled to perform uplink hybrid transmission. This fully utilizes channel bandwidth, and improves transmission efficiency.

Different from the foregoing embodiments, in this embodiment, when the AP or the STA has a flexible duplex mode, a transmission method for improving bandwidth utilization through multi-channel transmission is considered.

Figure 14:
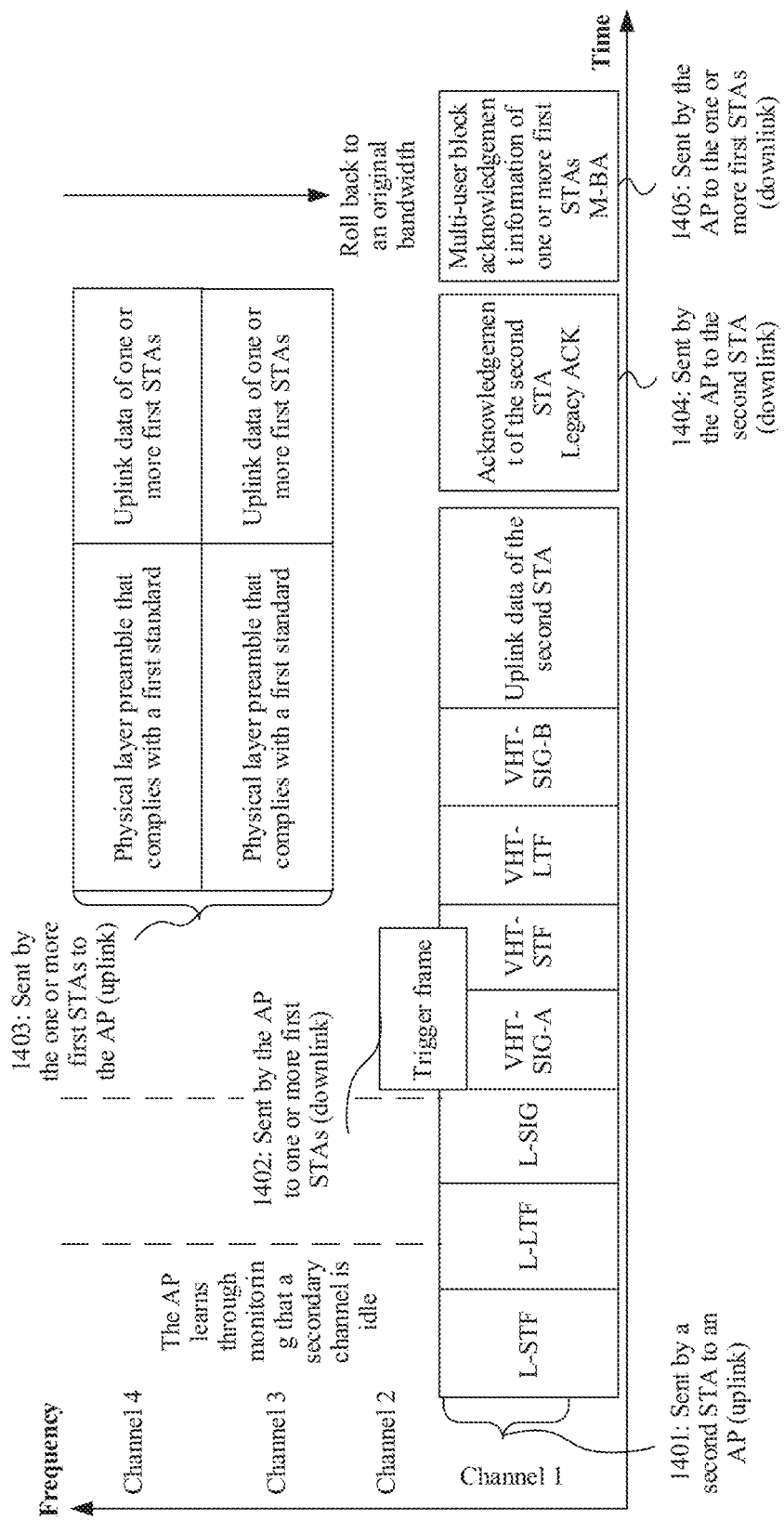
FIG. 14 is a schematic diagram of a time sequence of still yet another data transmission method according to an embodiment of this application.

In an optional example, when the AP having the flexible duplex mode receives one or more data packets sent by the one or more second STAs on the primary channel, the AP detects another channel through monitoring. When a secondary channel is idle, while receiving the data packets of the second STAs, the AP may send, on the primary channel or a non-repeated 80 MHz channel, a trigger frame that complies with the first standard, to trigger the one or more first STAs to perform uplink multi-user data transmission on the another secondary channel. When full-duplex transmission ends, a transmission bandwidth of the AP may continue to return to an original bandwidth, and the AP sends a multi-user block acknowledgement (M-BA for short) frame to the one or more first STAs. For example, FIG. 14 is an example diagram of full-duplex uplink hybrid transmission. The AP receives, on the primary channel, a PPDU 1401 sent by the one or more second STAs. When the AP learns through monitoring that a channel S40 is idle, the AP may send a trigger frame 1402 to the one or more first STAs on the primary channel, and the AP receives, on S40, a PPDU 1403 that carries data of the one or more first STAs. Further, the AP may feedback conventional acknowledgement information ACK 1404 to the one or more second STAs, and then the AP feeds back a multi-user block acknowledgement M-BA 1405 to the one or more first STAs.

Figure 15:
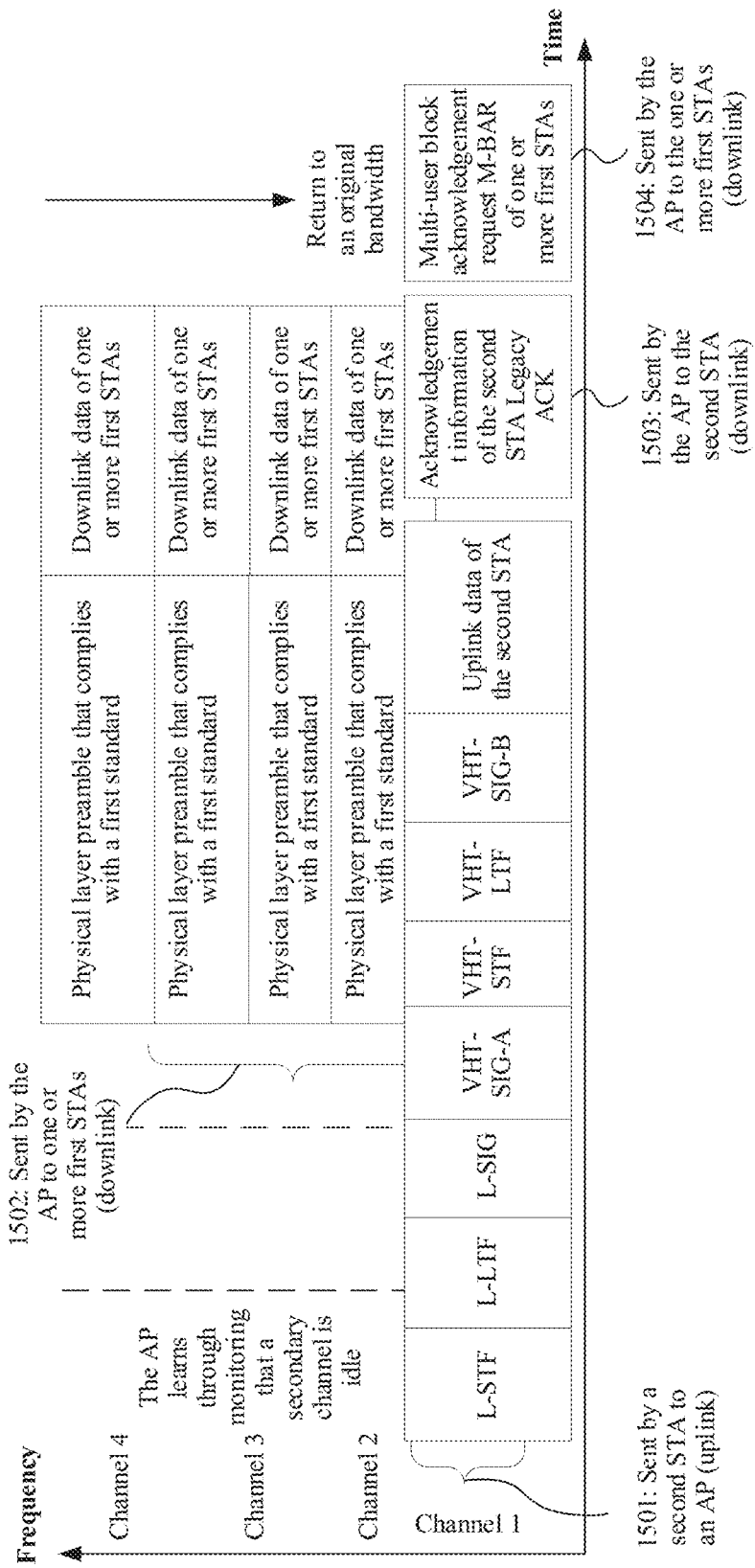
FIG. 15 is a schematic diagram of a time sequence of a further data transmission method according to an embodiment of this application.

In another optional example, when the AP having the full-duplex mode receives one or more data packets sent by one or more second STAs on the primary channel, the AP detects another channel through monitoring. For example, when a secondary channel is idle, the AP may send downlink data to the one or more first STAs on the primary channel and the another idle secondary channel. When the full-duplex transmission ends, the AP may continue to return to the original bandwidth, and send a multi-user block acknowledgement request (M-BAR for short). For example, FIG. 15 is an example diagram of full-duplex uplink/downlink hybrid transmission. The AP receives, on the primary channel, a PPDU 1501 sent by the one or more second STAs. When the AP learns through monitoring that channels S20 and S40 are idle, the AP may send a PPDU 1502 to the one or more first STAs on the primary channel, S20, and S40. Further, the AP may feedback conventional acknowledgement information ACK 1503 to the second STAs, and then the AP feeds back an M-BAR 1504 to the one or more first STAs.

In this embodiment, in the full-duplex mode, when receiving uplink data, the AP may use scheduled uplink hybrid transmission or downlink hybrid transmission, to fully utilize channels, and improve spectrum utilization and transmission efficiency.

This embodiment provides an automatic detection method.

Figure 16:
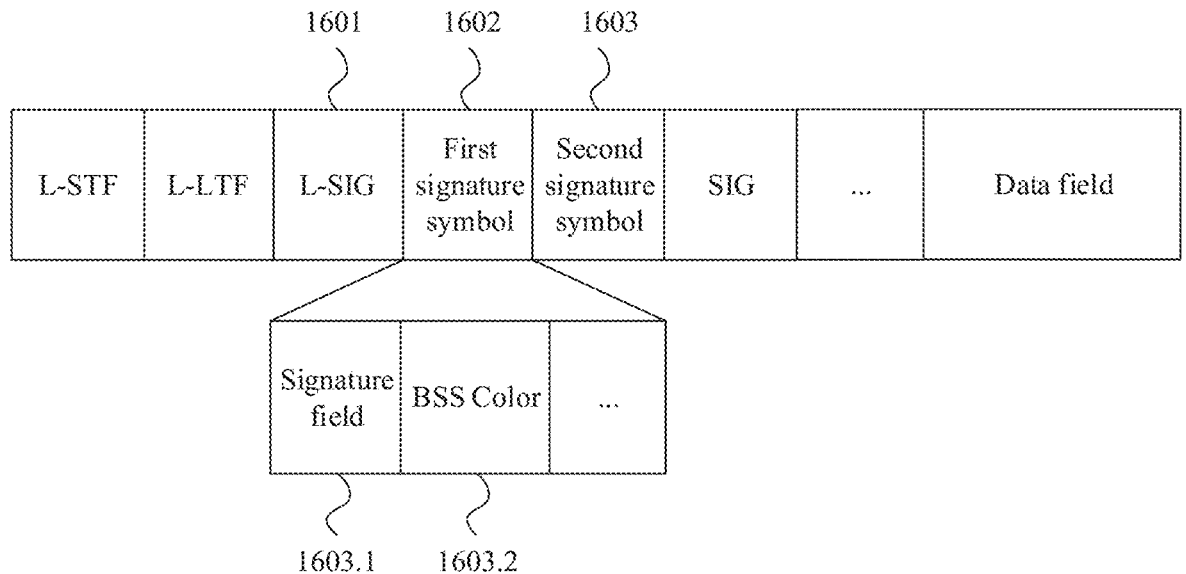
FIG. 16 is a schematic diagram of a PPDU that complies with a first standard according to an embodiment of this application.

FIG. 16 shows a frame structure of a PPDU that complies with a first standard. In addition to a legacy short training field L-STF, a legacy long training field L-LTF, and a legacy signal field L-SIG, after the legacy signal field L-SIG 1601, the PPDU that complies with the first standard further includes two signature symbols 1602 and 1603. The first signature symbol 1602 in the two signature symbols is binary phase shift keying (BPSK) modulation. The first signature symbol 1602 includes a predetermined signature field 1603.1, used to identify that the data packet including the signature field is a PPDU that complies with the first standard. The predetermined signature field includes information bits known by sending and receiving ends. When a first STA identifies that each of two symbols following the L-SIG 1601 carries the signature field 1603.1, the first STA determines that the data packet including the signature field is a PPDU that complies with the first standard. In addition, the signature symbols 1602 and 1603 each may further include other fields such as a basic service set color BSS color 1603.2, a cyclic redundancy code (CRC for short), and a binary convolution code (BCC for short) tail bit. Optionally, the two signature fields are same signature fields, or the two signature symbols are same signature symbols, to improve transmission robustness and enhance reliability of identifying the PPDU that complies with the first standard.

In addition, similar to the L-SIG and the RL-SIG in 802.11ax, a pilot sequence used for channel estimation also needs to be carried on four subcarriers whose subcarrier indexes are [−28, −27, 27, 28] and that are in each of the L-SIG and the first signature symbol. On four subcarriers whose subcarrier indexes are [−28, −27, 27, 28] and that are in the second signature symbol, the second signature symbol may be used to transmit information or a pilot sequence used for channel estimation.

Figure 17:
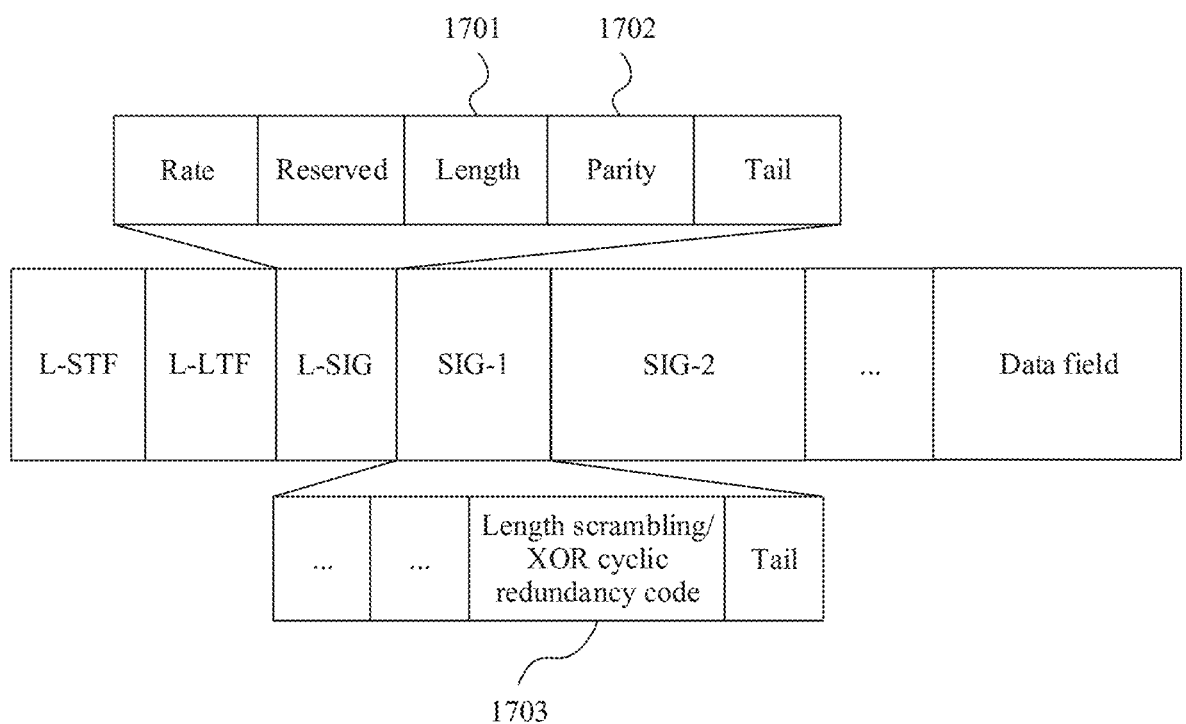
FIG. 17 is a schematic diagram of another PPDU that complies with a first standard according to an embodiment of this application.

FIG. 17 is an example diagram of a frame structure of another PPDU that complies with a first standard according to an embodiment of this application. In the frame structure of the foregoing PPDU that complies with the first standard, a length 1701 and/or a parity bit 1702 in the L-SIG field may be scrambled to a cyclic redundancy code CRC of a signaling symbol following the L-SIG. To be specific, the CRC of the signal field is scrambled by using the length 1701 and/or the parity bit 1702 in the L-SIG field, and a scrambled result is placed in a length scrambling CRC field in FIG. 17. In another implementation, the length 1701 and/or the parity bit 1702 in the L-SIG field may be XORed to a cyclic redundancy code CRC of a signaling symbol following the L-SIG. To be specific, an exclusive-OR operation is performed on the CRC of the signal field by using the length 1701 and/or the parity bit 1702 in the L-SIG field, and a result obtained after the exclusive-OR operation is placed in a length exclusive-OR CRC field in FIG. 17.

In this embodiment, even if a 1-bit parity bit in the L-SIG field is undetected (to be specific, when an even quantity of bits in the L-SIG are incorrect, the 1-bit parity bit cannot be detected), scrambling or exclusive OR is performed on the CRC. If the Length is incorrect, as a result, the CRC of a receive end is incorrect. Therefore, robustness of the L-SIG is improved, and a detection omission probability is reduced.

Figure 18:
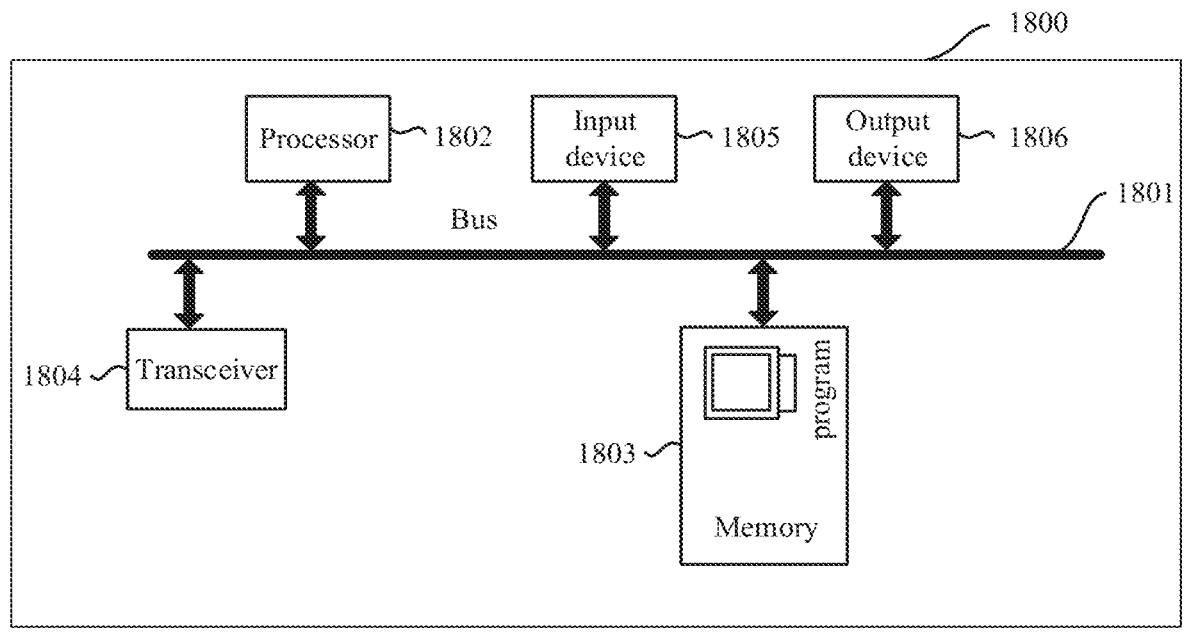
FIG. 18 is a schematic structural diagram of an access point according to an embodiment of this application.

FIG. 18 is a possible schematic structural diagram of a data sending apparatus 1800 according to the foregoing embodiments. The apparatus 1800 may be configured as the AP 103 in the foregoing WLAN communications system 100. The apparatus 1800 may include a processor 1802, a computer-readable storage medium/memory 1803, a transceiver 1804, an input device 1805, an output device 1806, and a bus 1801. The processor, the transceiver, the computer-readable storage medium, and the like are connected by using the bus. A specific connection medium between the foregoing components is not limited in the embodiments of this application.

The transceiver 1804 may be configured to: support the AP in communicating with the one or more first STAs in the foregoing embodiments, and further support the AP in communicating with the one or more second STAs in the foregoing embodiments, and may perform receiving and sending processes of the AP in FIG. 3 to FIG. 15 and/or another process used for the technology described in this application. For example, the transceiver 1804 may be configured to send first control information for the one or more first STAs on at least a primary channel. The first control information includes a first indication. The transceiver 1804 may further be configured to send a first data packet for the one or more first STAs on a first part channel of a total channel. The first data packet includes second control information. The transceiver 1804 may further be configured to send a second data packet for the one or more second STAs on a second part channel of the total channel. The transceiver 1804 may further be configured to receive uplink data that is sent by the one or more first STAs on the first part channel of the total channel based on first trigger information, and may further be configured to receive uplink data that is sent by the one or more second STAs on the second part channel of the total channel based on second trigger information. Certainly, the transceiver 1804 may further be configured to perform another process and method of the technology described in this application.

The processor 1802 is configured to control and manage an action of the AP, is configured to perform processing performed by the AP in the foregoing embodiments, may perform processing processes of the AP in FIG. 3 to FIG. 15 and/or another process used for the technology described in this application, may be responsible for managing the bus, and may execute a program or an instruction stored in the memory. For example, the processor 1802 may be configured to generate the first control information including the first indication.

The computer-readable storage medium/memory 1803 stores a program, an instruction, or data for performing the technical solutions of this application. For example, the computer-readable storage medium/memory 1803 may include an instruction sufficient to allow the apparatus 1800 to send the first control information to the one or more first STAs, may further include an instruction sufficient to allow the apparatus 1800 to send the first data packet for the one or more first STAs on the first part channel of the total channel after sending the first control information, and may further include an instruction sufficient to allow the apparatus 1800 to send the second data packet for the one or more second STAs on the second part channel of the total channel.

It may be understood that, FIG. 18 merely shows a simplified design of the AP. During actual application, the AP may include any quantities of transceivers, processors, memories, and the like, and all APs that can implement the present invention shall fall within the protection scope of the present invention.

Figure 19:
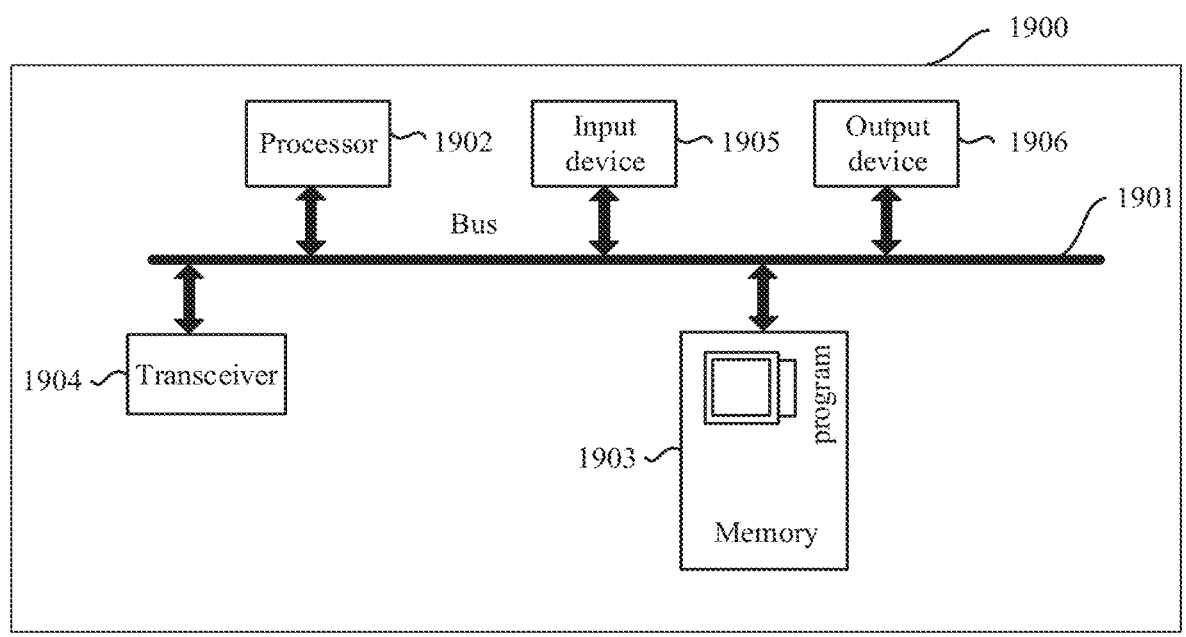
FIG. 19 is a schematic structural diagram of a station according to an embodiment of this application.

FIG. 19 is a possible schematic structural diagram of a data sending apparatus 1900 according to the foregoing embodiments. The apparatus 1900 may be configured as the first STA 101 in the foregoing WLAN communications system 100. The apparatus 1900 includes a processor 1902, a computer-readable storage medium/memory 1903, a transceiver 1904, an input device 1905, an output device 1906, and a bus 1901. The processor, the transceiver, the computer-readable storage medium, and the like are connected by using the bus. A specific connection medium between the foregoing components is not limited in the embodiments of this application.

The transceiver 1904 may be configured to support the first STA in communicating with the foregoing AP, and may perform communication or interaction processes related to the first STA in FIG. 3 to FIG. 15 and/or another process used for the technology described in this application. For example, the transceiver 1904 may be configured to receive first control information that includes a first indication and that is sent by the AP on at least a primary channel, and may further be configured to receive a first data packet on a first part channel of a total channel after receiving the first control information. The transceiver 1904 may further be configured to: after obtaining first trigger information, send uplink data to the AP on the first part channel of the total channel by using a resource unit indicated by the first trigger information.

The processor 1902 is configured to control and manage an action of the first STA, is configured to perform processing performed by the first STA in the foregoing embodiments, may perform processing processes of the first STA in FIG. 3 to FIG. 15 and/or another process used for the technology described in this application, may be responsible for managing the bus, and may execute a program or an instruction stored in the memory. For example, the processor 1902 may be configured to: with reference to the first control information and the second control information, obtain resource scheduling information and parse a data field of the first data packet.

The computer-readable storage medium/memory 1903 stores a program, an instruction, and data for performing the technical solutions of this application. For example, the computer-readable storage medium/memory 1903 may include an instruction sufficient to allow the apparatus 1900 to receive the first control information that includes the first indication and that is sent by the AP on at least the primary channel; may further include an instruction sufficient to allow the apparatus 1900 to receive the first data packet on the first part channel of the total channel after receiving the first control information; may further include an instruction sufficient to allow the apparatus 1900 to obtain, based on the first control information, second control information on one or more sub-channels indicated by the first indication; and may further include an instruction sufficient to allow the apparatus 1900 to obtain the resource scheduling information based on the first control information and the second control information.

It may be understood that, FIG. 19 merely shows a simplified design of the first STA. During actual application, the first STA may include any quantities of transceivers, processors, memories, and the like, and all first STAs that can implement the present invention shall fall within the protection scope of the present invention.

The processors in the apparatus 1800 and the apparatus 1900 may be general-purpose processors such as general-purpose central processing units (CPU), network processors (NP for short), or microprocessors, or may be application-specific integrated circuits (ASIC for short), or one or more integrated circuits configured to control program execution in the solutions of this application. The processors may alternatively be digital signal processors (DSP for short), field-programmable gate arrays (FPGA for short) or other programmable logic devices, discrete gates or transistor logic devices, or discrete hardware components. Alternatively, a controller/processor may be a combination of processors implementing a computing function, for example, a combination of one or more microprocessors, or a combination of the DSP and a microprocessor. The processor usually performs logical and arithmetic operations based on a program instruction stored in the memory.

The computer-readable storage medium/memory 1803 and the computer-readable storage medium/memory 1903 may further store an operating system and another application program. Specifically, the program may include program code, and the program code includes a computer operation instruction. More specifically, the memory may be a read-only memory (ROM for short), another type of static storage device that can store static information and an instruction, a random access memory (RAM for short), another type of dynamic storage device that can store information and an instruction, a magnetic disk memory, or the like. The memory 1803 may be a combination of the foregoing storage types. In addition, the computer-readable storage medium/memory may be located in the processor, or may be located outside the processor, or distributed in a plurality of entities including a processor or a processing circuit. The computer-readable storage medium/memory may be specifically embodied in a computer program product. For example, the computer program product may include a computer-readable medium in packaging materials.

Alternatively, the apparatus 1800 and the apparatus 1900 may be configured as universal processing systems. For example, the universal processing system is usually referred to as a chip. The general processing system includes one or more microprocessors that provide a processor function, and an external memory that provides at least a part of the storage medium. All these components are connected to other supporting circuits by using an external bus architecture.

Steps of the methods or algorithms described in combination with the content disclosed in this application may be implemented by hardware, or may be implemented by a processor by executing a software instruction. The software instruction may include a corresponding software module. The software module may be located in a RAM memory, a flash memory, a ROM memory, an EPROM memory, an EEPROM memory, a register, a hard disk, a removable magnetic disk, a CD-ROM, or a storage medium of any other form known in the art. For example, a storage medium is coupled to a processor, so that the processor can read information from the storage medium or write information into the storage medium. Certainly, the storage medium may alternatively be a component of the processor. The processor and the storage medium may be located in the ASIC. In addition, the ASIC may be located in user equipment. Certainly, the processor and the storage medium may exist in the user equipment as discrete components.

A person skilled in the art should be aware that in the foregoing one or more examples, functions described in the embodiments of this application may be implemented by hardware, software, firmware, or any combination thereof. When the functions are implemented by software, the foregoing functions may be stored in a computer-readable medium or transmitted as one or more instructions or code in the computer-readable medium. The computer-readable medium includes a computer storage medium and a communications medium. The communications medium includes any medium that enables a computer program to be transmitted from one place to another. The storage medium may be any available medium accessible to a general-purpose or dedicated computer.

The objectives, technical solutions, and benefits of this application are further described in detail in the foregoing specific embodiments. It should be understood that the foregoing descriptions are merely specific embodiments of this application, but are not intended to limit the protection scope of this application. Any modification, equivalent replacement, or improvement made based on technical solutions of this application shall fall within the protection scope of this application.

The invention claimed is:

1. A data transmission method, wherein the method comprises:
generating, by an access point (AP), a scheduling frame, wherein the scheduling frame comprises one or more first user information fields, one or more second user information fields, and a field indicating that the scheduling frame is of a trigger frame type, wherein the first user information field is configured to schedule a first station (STA) to perform uplink data transmission on a first part channel of a total channel, the second user information field is configured to schedule a second STA to perform uplink data transmission on a second part channel of the total channel, the first STA and the second STA have different capability sets, and the first part channel and the second part channel do not overlap; and
sending, by the AP, the scheduling frame.

2. The method according to claim 1, wherein the first STA complies with a version later than the 802.11ax standard protocol, and the second STA complies with the 802.11ax standard protocol.

3. The method according to claim 1, wherein the scheduling frame further comprises bandwidth indication information indicating that a bandwidth of the total channel is 320 MHz.

4. The method according to claim 1, wherein the method further comprises:
after receiving uplink hybrid data packets sent by the first STA and the second STA, sending, by the AP, a multi-user block acknowledgment to the first STA and the second STA.

5. The method according to claim 1, wherein the field indicating that the scheduling frame is of the trigger frame type complying with the standard version later than the 802.11ax standard protocol is located in a common part field of the scheduling frame.

6. The method according to claim 1, wherein the first user information field comprises at least one of:
an association identifier of the first STA, resource indication information of the first STA, a modulation and coding scheme MCS of the first STA, and an indication of a number of streams of the first STA.

7. A device, comprising:
a non-transitory memory storing instructions; and
one or more processors in communication with the memory, wherein the one or more processors execute the instructions to:
generate a scheduling frame, wherein the scheduling frame comprises one or more first user information fields, one or more second user information fields, and a field indicating that the scheduling frame is of a trigger frame type, wherein the first user information field is configured to schedule a first station STA to perform uplink data transmission on a first part channel of a total channel, the second user information field is configured to schedule a second STA to perform uplink data transmission on a second part channel of the total channel, the first STA and the second STA have different capability sets, and the first part channel and the second part channel do not overlap; and
send the scheduling frame.

8. The device according to claim 7, wherein the first STA complies with a version later than the 802.11ax standard protocol, and the second STA complies with the 802.11ax standard protocol.

9. The device according to claim 7, wherein the scheduling frame further comprises bandwidth indication information indicating that a bandwidth of the total channel is 320 MHz.

10. The device according to claim 7, wherein the one or more processors further execute the instructions to:
after receiving uplink hybrid data packets sent by the first STA and the second STA, send a multi-user block acknowledgment to the first STA and the second STA.

11. The device according to claim 7, wherein the field indicating that the scheduling frame is of the trigger frame type complying with the standard version later than the 802.11ax standard protocol is located in a common part field of the scheduling frame.

12. The device according to claim 7, wherein the first user information field comprises at least one of:
an association identifier of the first STA, resource indication information of the first STA, a modulation and coding scheme MCS of the first STA, and an indication of a number of streams of the first STA.

13. A non-transitory computer-readable media storing computer instructions, that when executed by one or more processors, cause the one or more processors to:
generate a scheduling frame, wherein the scheduling frame comprises one or more first user information fields, one or more second user information fields, and a field indicating that the scheduling frame is of a trigger frame type, wherein the first user information field is configured to schedule a first station STA to perform uplink data transmission on a first part channel of a total channel, the second user information field is used to schedule a second STA to perform uplink data transmission on a second part channel of the total channel, the first STA and the second STA have different capability sets, and the first part channel and the second part channel do not overlap; and
send the scheduling frame.

14. The non-transitory computer-readable media according to claim 13, wherein the first STA complies with a version later than the 802.11ax standard protocol, and the second STA complies with the 802.11ax standard protocol.

15. The non-transitory computer-readable media according to claim 13, wherein the scheduling frame further comprises bandwidth indication information indicating that a bandwidth of the total channel is 320 MHz.

16. The non-transitory computer-readable media according to claim 13, wherein the one or more processors are further caused to:
after receiving uplink hybrid data packets sent by the first STA and the second STA, send a multi-user block acknowledgment to the first STA and the second STA.

17. The non-transitory computer-readable media according to claim 13, wherein the field indicating that the scheduling frame is of the trigger frame type complying with the standard version later than the 802.11ax standard protocol is located in a common part field of the scheduling frame.

18. The non-transitory computer-readable media according to claim 13, wherein the first user information field comprises at least one of:

an association identifier of the first STA, resource indication information of the first STA, a modulation and coding scheme MCS of the first STA, and an indication of a number of streams of the first STA.

* * * * *